US012754376B2

(12) United States Patent
Nad et al.

(10) Patent No.: US 12,754,376 B2
(45) **Date of Patent: *Oct. 6, 2026**

(54) ELECTRO-OPTICAL CIRCUITS WITH MODULAR SWITCHABLE PHOTONIC INTERFACE

(71) Applicant: Intel Corporation, Santa Clara, CA (US)

(72) Inventors: Suddhasattwa Nad, Chandler, AZ (US); Benjamin Duong, Phoenix, AZ (US); Hiroki Tanaka, Gilbert, AZ (US); Brandon Marin, Gilbert, AZ (US); Jeremy Ecton, Gilbert, AZ (US); Gang Duan, Chandler, AZ (US); Srinivas Pietambaram, Chandler, AZ (US); Hari Mahalingam, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 33 days.

This patent is subject to a terminal disclaimer.

(21) Appl. No.: 18/090,260

(22) Filed: Dec. 28, 2022

(65) Prior Publication Data

US 2024/0219644 A1 Jul. 4, 2024

(51) Int. Cl.
*G02B 6/35* (2006.01)
*G02B 6/42* (2006.01)

(52) U.S. Cl.
CPC ............. *G02B 6/35* (2013.01); *G02B 6/4274* (2013.01)

(58) Field of Classification Search
CPC .......... G02B 6/30; G02B 6/35; G02B 6/3598; G02B 6/4204; G02B 6/4206; G02F 1/025; G02F 1/035; G02F 1/065; G02F 1/095
USPC .................................. 385/1-3, 8, 31, 40, 48
See application file for complete search history.

(56) References Cited

U.S. PATENT DOCUMENTS

| | | | |
|---|---|---|---|
| 6,845,184 B1 | 1/2005 | Yoshimura et al. | |
| 10,288,812 B1 | 5/2019 | Evans et al. | |
| 11,681,104 B1 * | 6/2023 | Ordouie ............... | G02B 6/3566 385/8 |
| 2016/0359568 A1 | 12/2016 | De Dobbelaere et al. | |
| 2020/0310052 A1 * | 10/2020 | Lim ..................... | G02B 6/4255 |
| 2021/0239904 A1 | 8/2021 | Chen et al. | |

(Continued)

OTHER PUBLICATIONS

Eltes, F., et al., "A BaTiO3-Based Electro-Optic Pockels Modulator Monolithically Integrated on an Advanced Silicon Photonics Platform", Journal of Lightwave Technology, vol. 37, No. 5, Mar. 1, 2019, pp. 1456-1462.

*Primary Examiner* — Robert Tavlykaev
(74) *Attorney, Agent, or Firm* — Essential Patents Group, LLP

(57) ABSTRACT

An integrated circuit (IC) module includes a photonic IC, an electrical IC, and a switchable waveguide device that, using a signal from the electrical IC, controls optical signals to or from the photonic IC. The switchable waveguide device may be formed by coupling metallization structures on both sides of, and either level with or below, a nonlinear optical material. The metallization structures may be in the photonic or electrical IC. The nonlinear optical material may be above the electrical IC in the photonic IC or on a glass substrate. The photonic and electrical ICs may be hybrid bonded or soldered together. The IC module may be coupled to a system substrate.

20 Claims, 17 Drawing Sheets

(56) References Cited

U.S. PATENT DOCUMENTS

| | | | | |
|---|---|---|---|---|
| 2022/0365273 | A1 | 11/2022 | Weng et al. | |
| 2023/0043794 | A1 * | 2/2023 | Winzer .................. | G02B 6/262 |

* cited by examiner

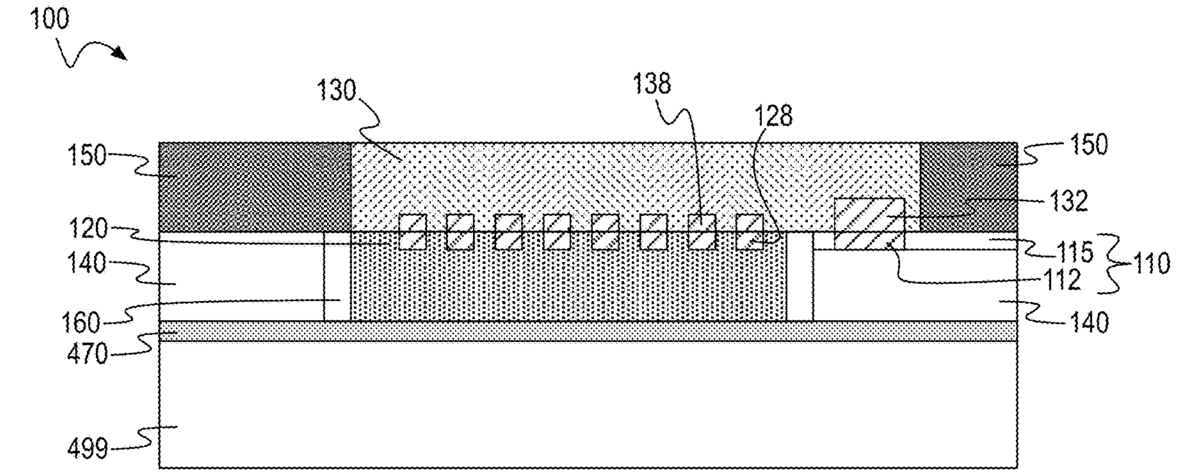
FIG. 4D
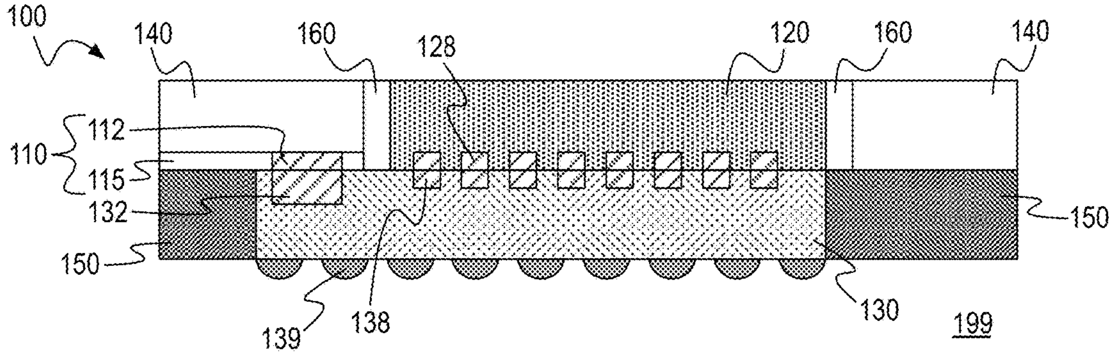
FIG. 4E
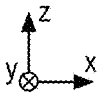

ELECTRO-OPTICAL CIRCUITS WITH MODULAR SWITCHABLE PHOTONIC INTERFACE

BACKGROUND

Integrating photonic and electrical circuits can improve system efficiencies by utilizing the superior characteristics of each of these differing technologies. For example, photonic and electrical technologies may be combined to increase data transmission speeds and capacities (e.g., with greater bandwidths) while reducing costs and energy consumption (e.g., with less restrictive cooling requirements).

However, an emergent need exists for heterogenous packaging solutions that enable compact, direct chip-to-chip connections between these mixed technology nodes. While discrete chips may provide this functionality, such discrete devices may require additional assembly processing or more substrate area, or they may have a higher cost per package. Advances are necessary to realize the benefits of both photonic and electrical circuits in increasingly dense integrations of these differing technologies.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements, e.g., with the same or similar functionality. The disclosure will be described with additional specificity and detail through use of the accompanying drawings:

FIGS. 4A, 4B, 4C, 4D, and 4E illustrate cross-sectional profile views of an electro-optical IC module, including a switchable waveguide device coupled to photonic and electrical ICs, at various stages of manufacture;

DETAILED DESCRIPTION

Figure 1A:
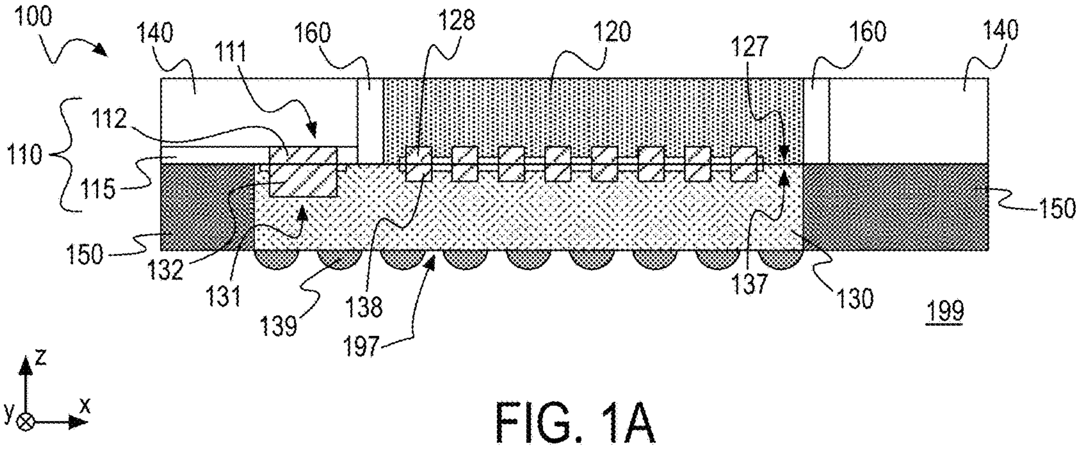
FIGS. 1A and 1B illustrate cross-sectional profile and isometric views of an electro-optical integrated circuit (IC) module, including a switchable waveguide device coupled to photonic and electrical ICs.

In the following detailed description, reference is made to the accompanying drawings that show, by way of illustration, specific embodiments in which the claimed subject matter may be practiced. These embodiments are described in sufficient detail to enable those skilled in the art to practice the subject matter. The various embodiments, although different, are not necessarily mutually exclusive. For example, a particular feature, structure, or characteristic described herein, in connection with one embodiment, may be implemented within other embodiments without departing from the spirit and scope of the claimed subject matter.

References within this specification to "one embodiment" or "an embodiment" mean that a particular feature, structure, or characteristic described in connection with the embodiment is included in at least one implementation encompassed within the present description. Therefore, the use of the phrase "one embodiment" or "in an embodiment" does not necessarily refer to the same embodiment. In addition, the location or arrangement of individual elements within each disclosed embodiment may be modified without departing from the spirit and scope of the claimed subject matter. The following detailed description is, therefore, not to be taken in a limiting sense, and the scope of the subject matter is defined only by the appended claims, appropriately interpreted, along with the full range of equivalents to which the appended claims are entitled.

The terms "over," "to," "between," and "on" as used herein may refer to a relative position of one layer with respect to other layers. One layer "over" or "on" another layer or bonded "to" another layer may be directly in contact with the other layer or may have one or more intervening layers. One layer "between" layers may be directly in contact with the layers or may have one or more intervening layers.

The terms "coupled" and "connected," along with their derivatives, may be used herein to describe structural relationships between components. These terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship, an electrical relationship, a functional relationship, etc.).

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The vertical orientation is in the z-direction and recitations of "top," "bottom," "above," and "below" refer to relative positions in the z-dimension with the usual meaning. However, embodiments are not necessarily limited to the orientations or configurations illustrated in the figure. The term "aligned" (i.e., vertically or laterally) indicates at least a portion of the components are aligned in the pertinent direction while "fully aligned" indicates an entirety of the components are aligned in the pertinent direction.

The terms "substantially," "close," "approximately," "near," and "about," generally refer to being within +/−10% of a target value (unless specifically specified). Unless otherwise specified in the specific context of use, the term "predominantly" means more than 50%, or more than half. For example, a composition that is predominantly a first constituent means more than half of the composition is the first constituent. The term "primarily" means the most, or greatest, part. For example, a composition that is primarily a first constituent means the composition has more of the first constituent than any other constituent. A composition that is primarily first and second constituents means the composition has more of the first and second constituents than any other constituent.

Unless otherwise specified, the use of the ordinal adjectives "first," "second," and "third," etc., to describe a common object, merely indicate that different instances of like objects to which are being referred and are not intended to imply that the objects so described must be in a given sequence, either temporally, spatially, in ranking, or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Views labeled "cross-sectional," "profile," and "plan" correspond to orthogonal planes within a cartesian coordinate system. Thus, cross-sectional and profile views are taken in the x-z and y-z planes, and plan views are taken in the x-y plane. Typically, profile views in the x-z plane are cross-sectional views. Where appropriate, drawings are labeled with axes to indicate the orientation of the figure.

Materials, structures, and techniques are disclosed for switching optical signals within electro-optical integrated circuit (IC) modules, including processes for manufacturing these structures. Electro-optical signal modulation can be used to control, e.g., switch on or off, optical signals that are received by or transmitted from electro-optical IC modules. A Pockel cell architecture can be used in electro-optical IC modules combining a photonic IC (PIC) and an electrical IC. The PIC, an integrated optical circuit, may be optically coupled to (or include within itself) a Pockel cell that is controlled by the electrical IC coupled to the PIC. The Pockel cell may include a nonlinear optical material and two electrodes and may act as a controllable waveguide. The nonlinear optical material may be any such material that exhibits the Pockels effect, where an electric field changes or produces birefringence in an optical medium. Using a control signal from the electrical IC, the electrodes may produce an electric field that modulates a photonic signal directed into the nonlinear optical material, e.g., by shifting the phase of the photonic signal. The nonlinear optical material may be advantageously positioned between the electrodes so that an electric field causes particularly favorable modulations of the photonic signal, such as signal attenuation. For example, the electric field may cause phase shifts of specific wavelengths, e.g., a quarter wavelength. Other phase shifts may be made. Such control by the electrical IC can switch photonic signals directed to or from the PIC completely on or completely off. In this way, a Pockel cell can form a switchable waveguide integrated in an electro-optical IC module. One electrical signal (or no signal) from the electrical IC may allow a photonic signal to pass through the waveguide unimpeded to (or from) the PIC, and another electrical signal may prevent the photonic signal from passing through the nonlinear optical material of the waveguide.

The components of the switchable waveguide may be deployed in a number of ways. In some embodiments, the nonlinear optical material and two electrodes are coupled to a glass substrate over the electrical IC such that the nonlinear optical material is optically coupled to the PIC, and the two electrodes are powered by the electrical IC. Coupling the nonlinear optical material and two electrodes to a glass substrate may provide processing flexibility, e.g., by facilitating separate processing of the PIC and switchable waveguide, for example, using different technology processes. Such separate processing may allow for a greater variety of nonlinear optical materials, e.g., materials not compatible with processing of the PIC. In some embodiments, the nonlinear optical material and two electrodes are included within the PIC, over the electrical IC, such that the two electrodes are powered by the electrical IC. Positioning the nonlinear optical material directly between the two electrodes (whether within or laterally adjacent the PIC) allows for a smaller control voltage to develop a sufficiently strong electric field for switching the photonic signal on and off. In some embodiments, the nonlinear optical material is over the electrical IC, and the two electrodes are within and powered by the electrical IC with the electrodes on either side of, but just below, the nonlinear optical material. In some such embodiments, the nonlinear optical material is coupled to a glass substrate and is optically coupled to the PIC. In some embodiments, the nonlinear optical material is included within the PIC. Not creating additional electrodes above the electrical IC (e.g., on a glass substrate) conserves processing operations, which may increase manufacturing throughput and reduce costs.

In some embodiments, the photonic and electrical ICs are hybrid bonded IC dies. Hybrid bonding may allow for finer pitches, e.g., of interconnect interfaces, including for control or signal lines. In other embodiments, the photonic and electrical ICs are soldered together. Such an assembly technique may allow for the use of discrete waveguide components. For example, a discrete nonlinear optical material may be coupled between the photonic and electrical ICs, e.g., in a V-groove in the PIC, and the photonic and electrical ICs may be soldered together. In some such embodiments, solder bond pads on either side of the discrete nonlinear optical material may serve as electrodes in the switchable waveguide. Electrodes on either side of a discrete nonlinear optical material may be at a same level with the nonlinear optical material or just below the nonlinear optical material.

Figure 1B:
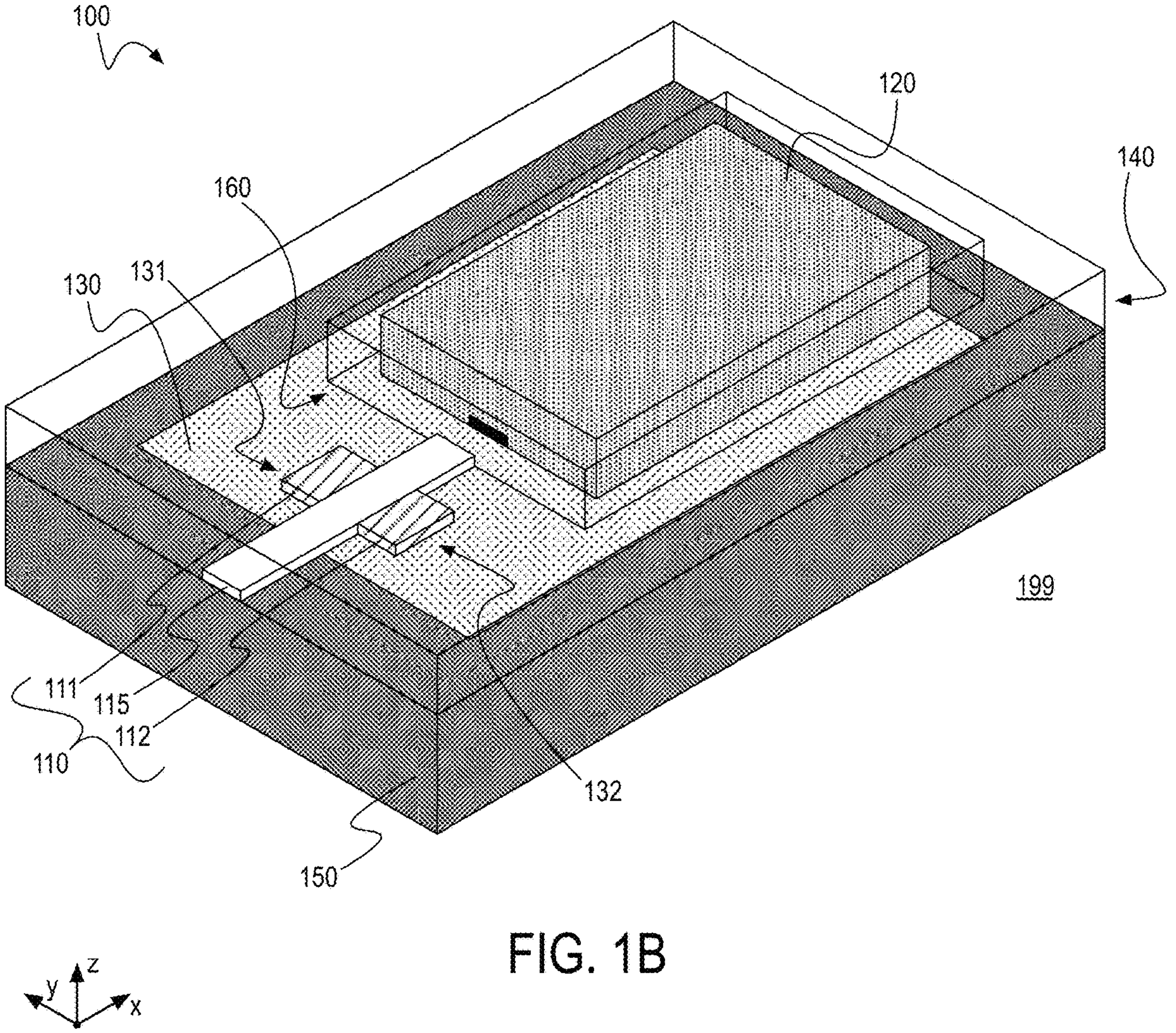

FIGS. 1A and 1B illustrate cross-sectional profile and isometric views of an electro-optical IC module 100, including a switchable waveguide device 110 coupled to a PIC 120 and an electrical IC 130, in accordance with some embodiments. FIG. 1A shows a cross-sectional profile view of electro-optical IC module 100, and FIG. 1B shows an isometric view of the same or a similar electro-optical IC module 100. Electro-optical IC module 100 includes at least two IC dies, PIC 120 directly bonded to electrical IC 130, and switchable waveguide device 110 (including nonlinear optical material 115 and first and second metallization structures 111, 112) optically coupled to PIC 120. Switchable waveguide device 110 includes nonlinear optical material 115 and first and second metallization structures 111, 112. Nonlinear optical material 115 is at a same level and between first and second metallization structures 111, 112. Switchable waveguide device 110 is over the portion of upper surface 137 of electrical IC 130 not covered by PIC 120. PIC 120 is laterally adjacent glass substrate 140, which is over electrical IC 130 and module dielectric 150. Transparent polymer 160 is between PIC 120 and nonlinear optical material 115, and between PIC 120 and glass substrate 140. Electrical IC 130 is laterally adjacent module dielectric 150. Electro-optical IC module 100 is coupled by electrical IC 130 to system substrate 199 at system surface 197, distal PIC 120.

PIC 120 may be an IC die including one or more photonic components and may include electrical components. These components may form an electro-optical IC that detects, generates, transports, processes (etc.) light. Optical components may include lasers, amplifiers, modulators, detectors, (de)multiplexers, waveguides, power splitters, and others. In the example of FIGS. 1A and 1B, PIC 120 receives and/or transmits photonic signals through switchable waveguide device 110 and transparent polymer 160, and receives electrical power from electrical IC 130. Although shown as at least somewhat opaque, PIC 120 may include substantially transparent materials and substantially transparent portions. In some embodiments, PIC 120 includes silicon. In some such embodiments, PIC 120 includes silicon nitride. In some embodiments, PIC 120 includes lithium niobite. In some embodiments, PIC 120 includes a compound semiconductor material, such as a III-V material, including indium phosphide (InP) or gallium arsenide (GaAs). Other materials may be used.

Switchable waveguide device 110 may convey optical signals to or from PIC 120. Switchable waveguide device 110 includes first and second metallization structures 111, 112 and nonlinear optical material 115 between, and at a same level as, metallization structures 111, 112. Nonlinear optical material 115 is on and coupled to glass substrate 140. Metallization structures 111, 112 are on and coupled to glass substrate 140. Nonlinear optical material 115 and metallization structures 111, 112 are over electrical IC 130 and between electrical IC 130 and a portion of glass substrate 140. First and second metallization structures 111, 112 are configured to develop an electric field between metallization structures 111, 112 from a charge or voltage differential caused by an electrical control signal from electrical IC 130. Electrical IC 130 includes third and fourth metallization structures 131, 132, which are configured to deliver an electrical control signal from electrical IC 130 to first and second metallization structures 111, 112. Metallization structures 111, 131 are coupled, and metallization structures 112, 132 are coupled. Third metallization structure 131 is behind (in the y direction) and obscured by fourth metallization structure 132 in FIG. 1A and is below (in the z direction) and obscured by at least first metallization structure 111 in FIG. 1B. Fourth metallization structure 132 is below (in the z direction) and obscured by at least 112 in FIG. 1B. Metallization structures 111, 112 are shown as having the same height (in the z direction) as nonlinear optical material 115, but (although at substantially the same level) metallization structures 111, 112 may have a slightly greater or lesser height than nonlinear optical material 115.

Advantageously, metallization structures 111, 112 and nonlinear optical material 115 (and metallization structures 131, 132, etc.) are sized and positioned such that the electric field is strongest directly between first and second metallization structures 111, 112 and through nonlinear optical material 115. Optimized positioning of first and second metallization structures 111, 112 relative to nonlinear optical material 115 may maximize field strength in nonlinear optical material 115 for a given signal voltage and so allow for smaller electrical control signals for switching switchable waveguide device 110. Although waveguide device 110 may be referenced as "switchable" and operation descriptions may refer to switching waveguide device 110 (or a photonic signal through waveguide device 110) on or off, waveguide device 110 (and its electrical control) is not so limited. Switchable waveguide device 110 may be used to otherwise modulate photonic signals.

Although in the example of FIGS. 1A and 1B an end of nonlinear optical material 115 is flush with a sidewall of electro-optical IC module 100, in other embodiments, nonlinear optical material 115 may have other lengths to facilitate optical coupling to electro-optical IC module 100. For example, in some embodiments, an end of nonlinear optical material 115 is laterally recessed, and electro-optical IC module 100 may receive, e.g., the end of an optical waveguide in the recess.

Any suitable nonlinear optical material may be used in nonlinear optical material 115, e.g., materials exhibiting the Pockels effect. In some embodiments, nonlinear optical material 115 includes a nonlinear crystal material. In some embodiments, nonlinear optical material 115 includes potassium and phosphorus (e.g., potassium dideuterium phosphate (KD*P or DKDP, e.g., $KD_2PO_4$) or potassium titanyl phosphate (e.g., $KTiOPO_4$)). In some embodiments, nonlinear optical material 115 includes barium, boron, and oxygen (BBO) (e.g., barium borate, such as $BaB_2O_4$ or $Ba(BO_2)_2$, including β-barium borate). BBO may be used advantageously for signals with higher average powers and/or higher switching frequencies. In some embodiments, nonlinear optical material 115 includes lithium, oxygen, and either niobium or tantalum (e.g., lithium niobate, such as $LiNbO_3$, or lithium tantalate, such as $LiTaO_3$). In some embodiments, nonlinear optical material 115 includes phosphorus, nitrogen, hydrogen, and oxygen (e.g., ammonium dihydrogen phosphate $(NH_4)(H_2PO_4)$).

Electrical IC 130 provides electrical power to PIC 120, e.g., to PIC interconnect interfaces 128 through electrical IC interconnect interfaces 138. Electrical IC 130 provides electrical control signals to switchable waveguide device 110 (and metallization structures 111, 112) via metallization structures 131, 132. These control signals control operation (switching) of switchable waveguide device 110. Electrical IC 130 may include semiconductor materials. In the example of FIGS. 1A and 1B, electrical IC 130 includes silicon. In some embodiments, electrical IC 130 includes a III-V or other compound semiconductor material, such as gallium arsenide. Other materials may be used.

The portion of upper surface 137 with interconnect interfaces 138 of electrical IC 130 is directly bonded to the lower surface 127 of PIC 120 at least at interconnect interfaces 128, 138. Direct bonding of ICs 120, 130 may be metal-to-metal, for example, with metallization features sintered together. In some embodiments, as in the example of ICs 120, 130 in FIGS. 1A and 1B, a hybrid bond is formed both between metallization features (e.g., via metal interdiffusion at least at interconnect interfaces 128, 138) and between dielectric materials (e.g., via Si—O—Si condensation bonds). Where both the metallization structures and the insulators, e.g., dielectric interfaces, between them are fused, the resultant structure includes a hybrid-bonded interface of both metallurgically interdiffused metals and chemically bonded insulators. Direct bonding (e.g., fusion bonding, including hybrid bonding) between ICs 120, 130 may allow for (relative to, e.g., soldered ICs) finer feature dimensions and feature pitches, for example, of metallization features, such as of metallization structures 111, 112 (and 131, 132) and of interconnect interfaces 128, 138. Direct bonding, e.g., without solder or other additional intermediate layer, may allow for tighter IC-stack vertical dimensions and improved (e.g., simplified) assembly process flow.

Electro-optical IC module 100 is coupled, and electrically connected, to a system substrate 199 by system interconnect interfaces 139 on system surface 197 of electrical IC 130, distal PIC 120. Electro-optical IC module 100 is coupled, and electrically connected, to a power supply through system substrate 199. System substrate 199 may be any host component, such as a package substrate or interposer, an IC die, etc. In some embodiments, system substrate 199 is a packaging substrate and includes conductive traces in one or more dielectric layers (e.g., a redistribution layer (RDL)). System substrate 199 may or may not include a core layer. System substrate 199 may couple to another host component, such as a package substrate or interposer, another IC die, etc. System substrate 199 may include a power supply or be coupled to a power supply through another host component.

Glass substrate 140 is laterally adjacent PIC 120 and over electrical IC 130 and/or module dielectric 150. Besides supporting nonlinear optical material 115, glass substrate 140 may otherwise facilitate assembly of electro-optical IC module 100, e.g., using variously sized ICs 120, 130. For example, a certain size of electrical IC 130 may be used with multiple sizes of PIC 120 by using glass substrates 140 with outside dimensions matched to those of electrical IC 130 (or module dielectric 150) and inside dimensions (of a cavity or void) substantially matched to those of PIC 120. In some embodiments, PIC 120 has a lateral area greater than a lateral area of electrical IC 130. In some such embodiments, PIC 120 is over module dielectric 150. In some such embodiments, glass substrate 140 is laterally adjacent PIC 120 and over module dielectric 150. In some embodiments, as in FIGS. 1A and 1B, electrical IC 130 has a lateral area greater than a lateral area of PIC 120. In some such embodiments, glass substrate 140 is laterally adjacent PIC 120 and over electrical IC 130 and module dielectric 150. Glass substrate 140 is over electrical IC 130 and/or module dielectric 150, and may be coupled to one or both of electrical IC 130 and module dielectric 150. In some embodiments, glass substrate 140 is coupled to PIC 120, which is directly bonded to at least electrical IC 130. In some such embodiments, glass substrate 140 is coupled to PIC 120 by transparent polymer 160. Glass substrate 140 may, as in the example of FIGS. 1A and 1B, have an upper surface substantially coplanar with an upper surface of PIC 120 and/or transparent polymer 160.

Transparent polymer 160 adjoins nonlinear optical material 115 and is laterally between nonlinear optical material 115 and PIC 120. Transparent polymer 160 is configured to convey an optical signal transmitted through nonlinear optical material 115 to PIC 120. Transparent polymer 160 may be index-matched to one or both of nonlinear optical material 115 and PIC 120. In some embodiments, transparent polymer 160 has an index of refraction approximately equal to an index of refraction of nonlinear optical material 115. In some embodiments, transparent polymer 160 has an index of refraction approximately equal to an index of refraction of PIC 120. In the example of FIGS. 1A and 1B, transparent polymer 160 laterally encircles PIC 120, surrounding PIC 120 on all sides. In some embodiments, transparent polymer 160 is on fewer than four sides, e.g., one side, of PIC 120. In some embodiments, nonlinear optical material 115 directly contacts (and optically couples to) PIC 120 with no transparent polymer 160 between them.

Module dielectric 150 is an electrical insulator coupled to electrical IC 130. Module dielectric 150 laterally encircles electrical IC 130, surrounding electrical IC 130 on all sides. Module dielectric 150 is between system substrate 199 and glass substrate 140, which is coupled to PIC 120 through transparent polymer 160. In some embodiments, module dielectric 150 is between system substrate 199 and PIC 120. Module dielectric 150 has one or more sidewalls substantially coplanar with the sidewalls of glass substrate 140. Module dielectric 150 may be any suitable material. In some embodiments, module dielectric 150 is an organic material. In some such embodiments, module dielectric 150 is a mold compound, such as an opaque epoxy plastic. In some embodiments, module dielectric 150 is a ceramic material.

In some embodiments, electro-optical IC module 100 includes one or more other photonic or electrical IC dies, e.g., a microcontroller. Additional IC dies may be coupled to either or both of ICs 120, 130, e.g., on a top surface of IC 120, 130. Such additional IC dies may be laterally surrounded by, e.g., glass substrate 140 or module dielectric 150.

Figure 2A:
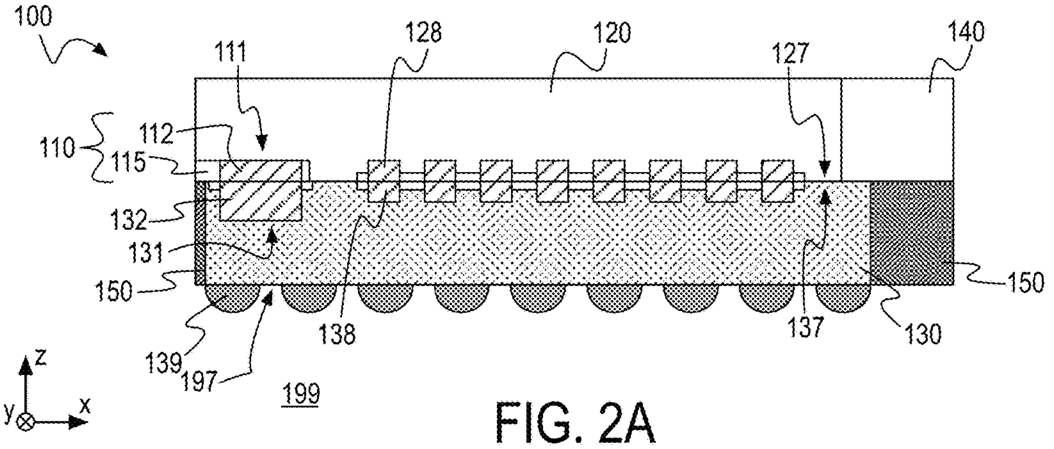
FIGS. 2A and 2B illustrate cross-sectional profile and isometric views of an electro-optical IC module, including a switchable waveguide device included within a photonic IC and coupled to an electrical IC.
Figure 2B:
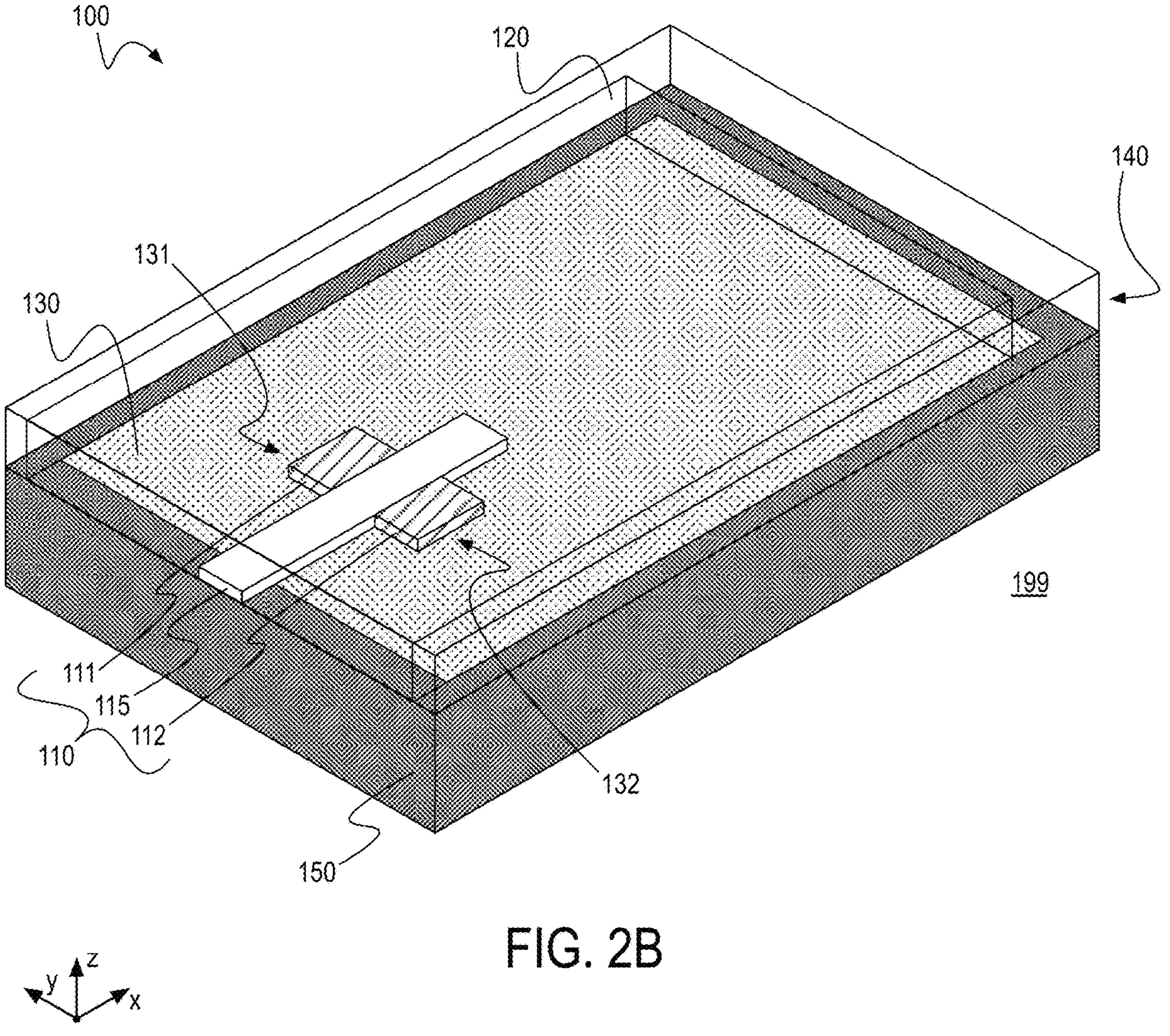

FIGS. 2A and 2B illustrate cross-sectional profile and isometric views of electro-optical IC module 100, including switchable waveguide device 110 included within PIC 120 and coupled to electrical IC 130, in accordance with some embodiments. Switchable waveguide device 110 again includes nonlinear optical material 115 between and at a same level as first and second metallization structures 111, 112. In the example of FIGS. 2A and 2B, switchable waveguide device 110 is included within PIC 120. PIC 120 includes nonlinear optical material 115 and metallization structures 111, 112. Nonlinear optical material 115 (and so switchable waveguide device 110) is optically coupled to one or more other photonic components (not shown) within PIC 120.

In some embodiments, photonic and electrical ICs 120, 130 are direct bonded at metallization structures 111, 112 and metallization structures 131, 132. In some embodiments, photonic and electrical ICs 120, 130 are hybrid bonded at metallization structures 111, 112 and metallization structures 131, 132. In some such embodiments, nonlinear optical material 115 is fusion bonded, e.g., to a dielectric or insulator material on an upper surface of electrical IC 130.

PIC 120 is shown as transparent, but some components (e.g., interconnect interfaces 128, 138 of ICs 120, 130, respectively) are left unshown in FIG. 2B for illustrative purposes. Interconnect interfaces 128, 138 (not shown in FIG. 2B) may be at the interface of the substantially coplanar, bonded surfaces 127, 137 of ICs 120, 130. In some embodiments, at least some of interconnect interfaces 128, 138 provide electrical connections between ICs 120, 130. In some embodiments, at least some of interconnect interfaces 128, 138 are positioned to provide good structural connections between ICs 120, 130.

Glass substrate 140 is again laterally adjacent PIC 120 and over electrical IC 130 and module dielectric 150. In some embodiments, PIC 120 has a lateral area greater than a lateral area of electrical IC 130 and has sidewalls substantially coplanar with sidewalls of module dielectric 150. In some such embodiments, electro-optical IC module 100 has no glass substrate 140 laterally adjacent PIC 120 and over module dielectric 150.

Module dielectric 150 is again laterally adjacent electrical IC 130. In some embodiments, electrical IC 130 has a lateral area greater than a lateral area of PIC 120. In some such embodiments, electro-optical IC module 100 has no module dielectric 150 laterally adjacent electrical IC 130, and glass substrate 140 is laterally adjacent PIC 120 and over electrical IC 130. In some embodiments, electrical IC 130 has a lateral area approximately equal to a lateral area of PIC 120, electrical IC 130 has sidewalls substantially coplanar with sidewalls of PIC 120, and electro-optical IC module 100 has no glass substrate 140 laterally adjacent PIC 120 or module dielectric 150 laterally adjacent electrical IC 130. In some such embodiments, the lateral area of electro-optical IC module 100 is advantageously minimized by forgoing the use of extraneous glass substrate 140 or module dielectric 150.

Electro-optical IC module 100 is coupled by electrical IC 130 to system substrate 199 at system surface 197, distal PIC 120.

Figure 3:
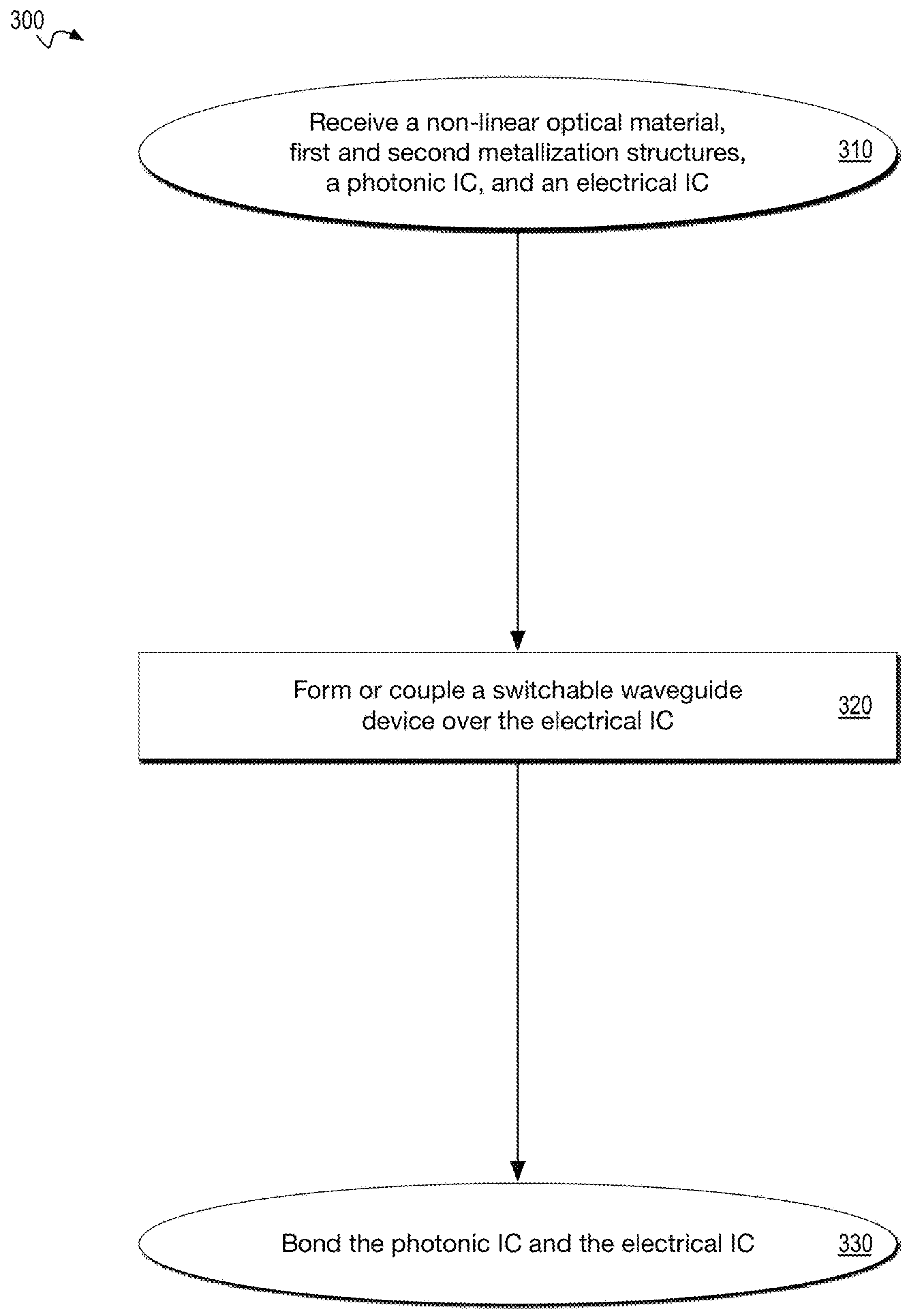
FIG. 3 illustrates various processes or methods for forming an electro-optical IC module, including a switchable waveguide device coupled to an electrical IC and coupled to or within a photonic IC.

FIG. 3 illustrates various processes or methods 300 for forming an electro-optical IC module, including a switchable waveguide device coupled to an electrical IC and coupled to or within a photonic IC, in accordance with some embodiments. FIG. 3 shows methods 300 that includes operations 310-330. Some operations shown in FIG. 3 may overlap with other operations. FIG. 3 shows an example sequence, but the operations can be done in other sequences as well, and some operations may be omitted. Some operations can also be performed multiple times before other operations are performed. Additional, optional operations will be described. Methods 300 generally entail forming an electro-optical IC module by forming or coupling a switchable waveguide device over an electrical IC and bonding photonic and electrical ICs.

FIGS. 4A, 4B, 4C, 4D, and 4E illustrate cross-sectional profile views of electro-optical IC module 100, including switchable waveguide device 110 coupled to photonic and electrical ICs 120, 130, at various stages of manufacture, in accordance with some embodiments.

Returning to FIG. 3, in operation 310, photonic and electrical ICs are received. Components for a switchable waveguide device (or the materials for forming them) are received at operation 310 as well, including electrodes (e.g., first and second metallization structures) and a nonlinear optical material. In some embodiments, a switchable waveguide device is received with nonlinear optical material between first and second metallization structures, all included within a PIC. In some embodiments, a switchable waveguide device is received with nonlinear optical material coupled to a glass substrate between first and second metallization structures also coupled to the glass substrate. In some such embodiments, the glass substrate is coupled to a PIC, e.g., by a transparent polymer. In some embodiments, a coupled glass substrate and PIC are on a carrier, e.g., for handling or structural support. In some such embodiments, the glass substrate and PIC are coupled by a sacrificial or removable interface layer. In some embodiments, the PIC and a glass substrate are received with both coupled to a carrier and with a void laterally between the PIC and the glass substrate on at least one side of the PIC, e.g., without a transparent polymer between them. In some such embodiments, a transparent polymer is formed between the photonic IC and the glass substrate, e.g., between the photonic IC and nonlinear optical material deposited on, or otherwise coupled to, the glass substrate. The transparent polymer may be formed to fill a void between the PIC and the glass substrate on one or more sides of the PIC. In some embodiments, transparent polymer is formed between the PIC and the glass substrate and laterally surrounds the PIC.

In some embodiments, components for a switchable waveguide device (or the materials for forming them) are received as separate components, e.g., that may later be coupled. For example, one or more metals or nonlinear optical material may be received and later deposited on, e.g., a glass substrate or PIC. The nonlinear optical material may be as previously described, e.g., a nonlinear crystal material exhibiting the Pockels effect, etc.

Figure 4A:
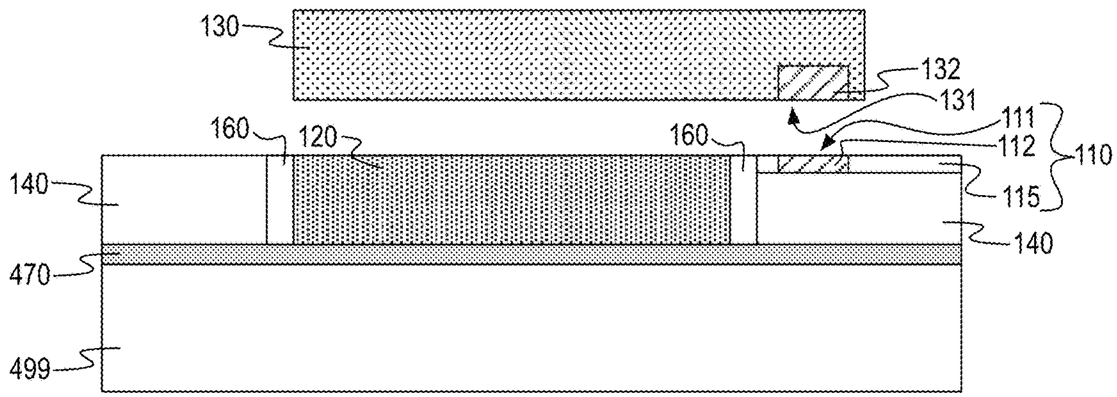

FIG. 4A shows an example received nonlinear optical material 115, metallization structures 111, 112, and photonic and electrical ICs 120, 130. PIC 120 and electrical IC 130 are not coupled. Nonlinear optical material 115 and metallization structures 111, 112 are coupled to glass substrate 140. Metallization structure 111 is behind (in the y direction) nonlinear optical material 115, which is between and at a same level as metallization structures 111, 112. Switchable waveguide device 110 includes nonlinear optical material 115 and metallization structures 111, 112 and is optically coupled to PIC 120 through transparent polymer 160. PIC 120 is coupled to glass substrate 140 by transparent polymer 160 between them. PIC 120 and glass substrate 140 are on carrier 499. PIC 120 and glass substrate 140 are coupled to carrier 499 by interface layer 470. In some embodiments, interface layer 470 is a sacrificial or removable interface layer. Interface layer 470 may facilitate handling of, e.g., PIC 120 during processing and later serve as a release layer, allowing further handling and assembly without carrier 499.

Electrical IC 130 is shown with metallization structure 132, which (along with metallization structures 131) may later be coupled to metallization structures 111, 112. Metallization structure 111 is behind (in the y direction) metallization structure 132. PIC 120 and electrical IC 130 may also include interconnect interfaces 128, 138. In some embodiments, interconnect interfaces 128, 138 are later formed, e.g., for bonding photonic and electrical ICs 120, 130. In some embodiments, metallization structures 131, 132 are later formed, e.g., for connecting metallization structures 111, 112 (and switchable waveguide device 110) to electrical IC 130.

Returning to FIG. 3, a switchable waveguide device is formed or coupled over the electrical IC at operation 320. The switchable waveguide device includes a nonlinear optical material and metallization structures on either side of the nonlinear optical material. The nonlinear optical material is at the same level as and between the two metallization structures. In some embodiments, the switchable waveguide device is received formed, and the switchable waveguide device is coupled to and over the electrical IC in operation 320. For example, the nonlinear optical material and two metallization structures may be received already coupled to a glass substrate, and the glass substrate may be coupled over the electrical IC such that two metallization structures of the switchable waveguide device are coupled to a corresponding pair of metallization structures in the electrical IC. The corresponding metallization structures in the electrical IC may serve as bonding structures, as well as electrical connections for delivering a voltage to the switchable waveguide device to develop an electric field between the paired metallization structures of the switchable waveguide device and through the nonlinear optical material. In some embodiments, coupling the switchable waveguide device over the electrical IC includes, e.g., direct bonding two metallization structures of the switchable waveguide device (over and) to corresponding metallization structures in a pair of metallization structures in the electrical IC (on the upper surface of the electrical IC).

In some embodiments, the switchable waveguide device is formed by depositing the nonlinear optical material and metal on the glass substrate (the nonlinear optical material between and on same level as two deposited metallization structures). In some embodiments, the switchable waveguide device is formed by depositing the nonlinear optical material and metal on the PIC (the nonlinear optical material between and on same level as two deposited metallization structures). In some embodiments, the PIC is received with two or more metallization structures, and the switchable waveguide device is formed by depositing the nonlinear optical material on the PIC between, and on a same level as, two metallization structures. In some embodiments, the glass substrate is received with two or more metallization structures, and the switchable waveguide device is formed by depositing the nonlinear optical material on the glass substrate between, and on a same level as, two metallization structures.

In operation 330, the photonic and electrical IC dies are direct bonded. In some embodiments, the photonic and electrical ICs are hybrid bonded. In some embodiments, direct bonding the photonic and electrical ICs includes bonding the switchable waveguide device to the electrical IC. Bonding the ICs may involve multiple sub-tasks, including in preparation for contacting the photonic and electrical IC dies. For example, cleaning, etc., may improve bonding, e.g., by increasing bond strength. Direct bonding enables very fine connections, e.g., of metallization structures with small dimensions and pitches. As such, surfaces to be direct bonded may be have strict planarity and alignment requirements. In some embodiments, bond formation commences with die contact, so precise alignment prior to contact may advantageously be practiced. Once adequately aligned, the photonic and electrical IC dies may be contacted and bonded. Direct bonding of the photonic and electrical IC dies may be metal-to-metal, for example, during which metallization structures sinter. Thermo-compression bonding may allow for bonding at low temperatures (e.g., below melting temperature of the interconnects). With compression only, direct bonding is still possible, e.g., even at room temperature. In some embodiments, hybrid bonding occurs between both metallization features (e.g., via metal interdiffusion) and between dielectric materials (e.g., via Si—O—Si condensation bonds). Post bonding, heating (including selective heating) may strengthen the bond (e.g., by converting a van der Waals bond into a sintered metal-metal bond through interdiffusion). A laser may be employed to selectively heat one of the photonic and electrical IC dies (or even just portions of one or both dies). Pre-processing the photonic or electrical IC dies, e.g., with a plasma clean prior to bonding, may activate their surfaces for bonding and may increase bond strength or allow for a lower-temperature anneal post bonding.

Figure 4B:
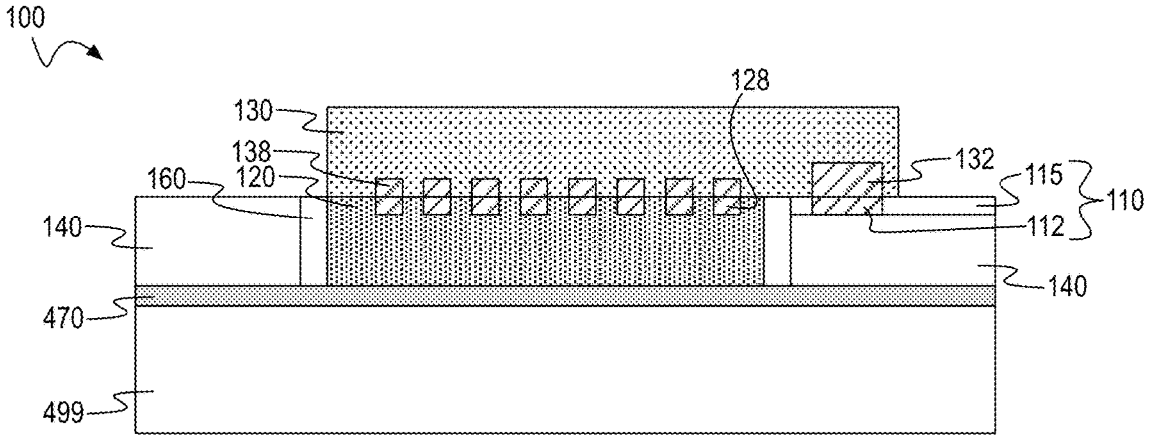

FIG. 4B shows electro-optical IC module 100 with direct bonded photonic and electrical ICs 120, 130. Photonic and electrical ICs 120, 130 are direct bonded at least at interconnect interfaces 128, 138. In some embodiments, metallization structures 111, 131 are direct bonded, and metallization structures 112, 132 are direct bonded. In some embodiments, photonic and electrical ICs 120, 130 are hybrid bonded. Photonic and electrical ICs 120, 130 may be direct bonded at interconnect interfaces 128, 138 (and metallization structures 111, 131 and metallization structures 112, 132), as well as at, e.g., dielectric interfaces between the metallization structures. Switchable waveguide device 110 includes nonlinear optical material 115 between metallization structures 111, 112 and is coupled over electrical IC 130. Switchable waveguide device 110 is coupled, and electrically connected, to electrical IC 130 by metallization structures 111, 131 and metallization structures 112, 132.

Returning to FIG. 3, processes or methods 300 for forming an electro-optical IC module may further include encapsulating one or both of the bonded IC dies in a module dielectric, e.g., by forming an organic mold compound over one or both of the bonded IC dies. The module dielectric may be any suitable insulator and may protect the electro-optical IC module, e.g., from moisture. The module dielectric may also give the electro-optical IC module a beneficial size and shape for further processing or assembly. For example, the module dielectric may make up a portion of the electro-optical IC module meant to abut a host component, and the abutting portion, e.g., a surface, may be improved (e.g., advantageously increased in size). As such, the module dielectric may protect the electro-optical IC module, including by protecting the joining of the electro-optical IC module and a host component. The module dielectric may be formed over one or more of the PIC, the electrical IC, the glass substrate, etc.

Figure 4C:
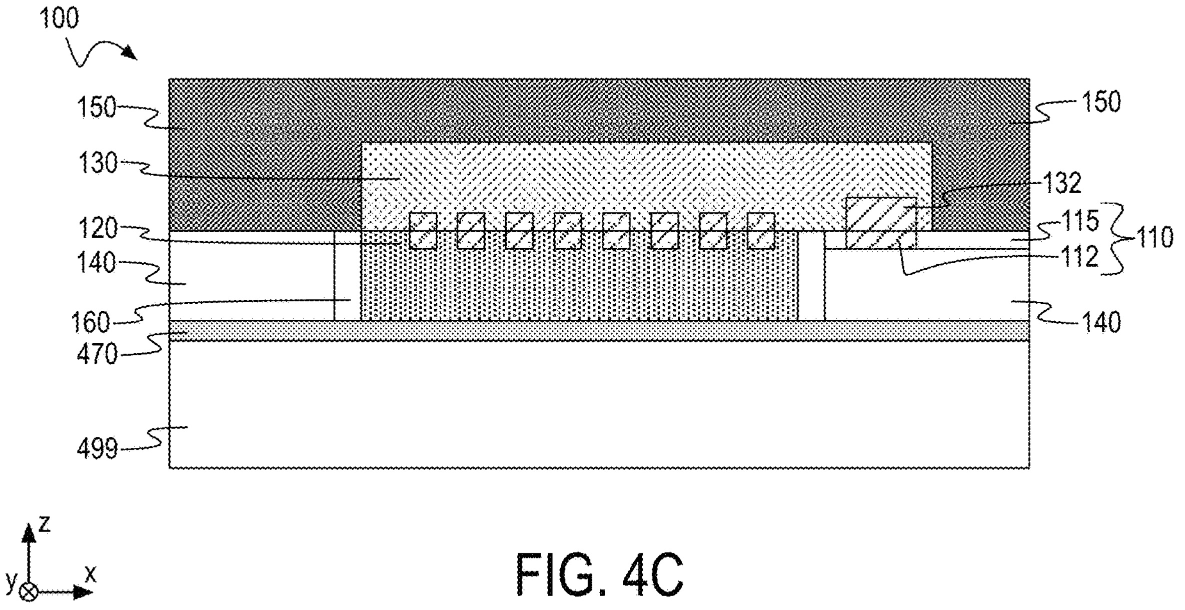

FIG. 4C shows module dielectric 150 over portions of electro-optical IC module 100 and encapsulating, e.g., electrical IC 130. Module dielectric 150 is over electrical IC 130 (entirely covering the surface distal PIC 120) and at least portions of switchable waveguide device 110, glass substrate 140, and transparent polymer 160. Module dielectric 150 may be coupled to, e.g., glass substrate 140 and may insulate electrical IC 130 and protect it (and its bonded connections) from moisture, etc. In covering portions of electrical IC 130 and glass substrate 140, etc., module dielectric 150 notably covers the joining of photonic and electrical ICs 120, 130.

Returning to FIG. 3, processes or methods 300 for forming an electro-optical IC module may further include planarizing one or more surfaces of the electro-optical IC module, e.g., a surface of the module dielectric. For example, the module dielectric may be planarized by a chemical-mechanical polish or planarization (CMP), which may remove material down to an upper surface of one of the IC dies. A CMP may be performed on other materials or surfaces.

FIG. 4D shows electro-optical IC module 100 with electrical IC 130 having an exposed surface distal PIC 120 and module dielectric 150 on both sides. In some embodiments, module dielectric 150 has been planarized, e.g., by CMP, down to have a substantially coplanar surface with electrical IC 130 distal PIC 120. The exposed surface of electrical IC 130 distal PIC 120 is available for bonding (and electrically connecting), e.g., to system substrate 199.

Returning to FIG. 3 and processes or methods 300, processing may further include decoupling the electro-optical IC module from a carrier. In some embodiments, a release layer is used to decouple the carrier, for example, with a thermal or light, e.g., laser or ultraviolet (UV), exposure. The electro-optical IC module may be removed by any suitable means. In some embodiments, a carrier substrate may be ground away. A surface exposed by removing the carrier may be planarized, e.g., by CMP, to prepare the surface for further processing, for example, coupling to other structures.

Processes or methods 300 may also include forming or preparing interconnect interfaces on a surface of the electro-optical IC module, e.g., on a surface of the photonic IC distal the electrical IC or on a surface of the electrical IC distal the photonic IC. Such interconnect interfaces, e.g., bond pads for soldering or other metallization features for bonding, may be for coupling the electro-optical IC module to a host component, such as a system substrate, or for coupling, e.g., another IC die to the electro-optical IC module.

Processes or methods 300 may also include singulating the electro-optical IC module, e.g., from adjacent electro-optical IC modules with contiguous module dielectric. In some embodiments, electro-optical IC modules are processed in parallel with other, adjacent modules that, for example, use portions from the same glass substrate or application of module dielectric. In some embodiments, one of the IC dies, e.g., the larger of the ICs, are contiguous with other dies that are part of a same wafer. The singulation may be by any suitable means. In some embodiments, electro-optical IC modules are mechanically sawn from other electro-optical IC modules. In some embodiments, the singulation is by laser scribe. In some embodiments, a die, substrate, or other structure is scored and mechanically fractured along the scoring.

FIG. 4E shows electro-optical IC module 100 not coupled to any carrier 499. An upper surface of PIC 120, glass substrate 140, and transparent polymer 160 are exposed and substantially coplanar. A lower surface of electrical IC 130 and module dielectric 150 are exposed and substantially coplanar. System interconnect interfaces 139 on the lower surface of electrical IC 130 are coupled to system substrate 199.

Figure 5A:
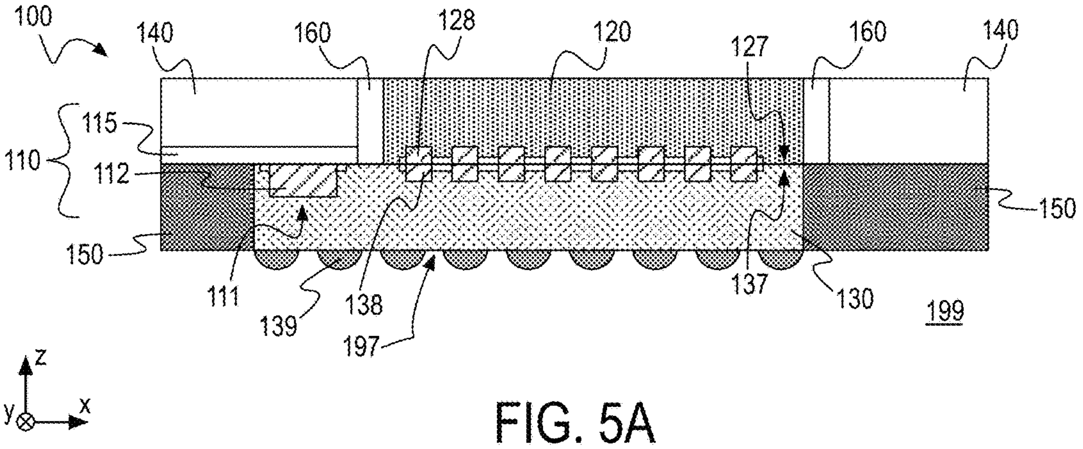
FIGS. 5A and 5B illustrate cross-sectional profile and isometric views of an electro-optical IC module, including a switchable waveguide device and photonic and electrical ICs.
Figure 5B:
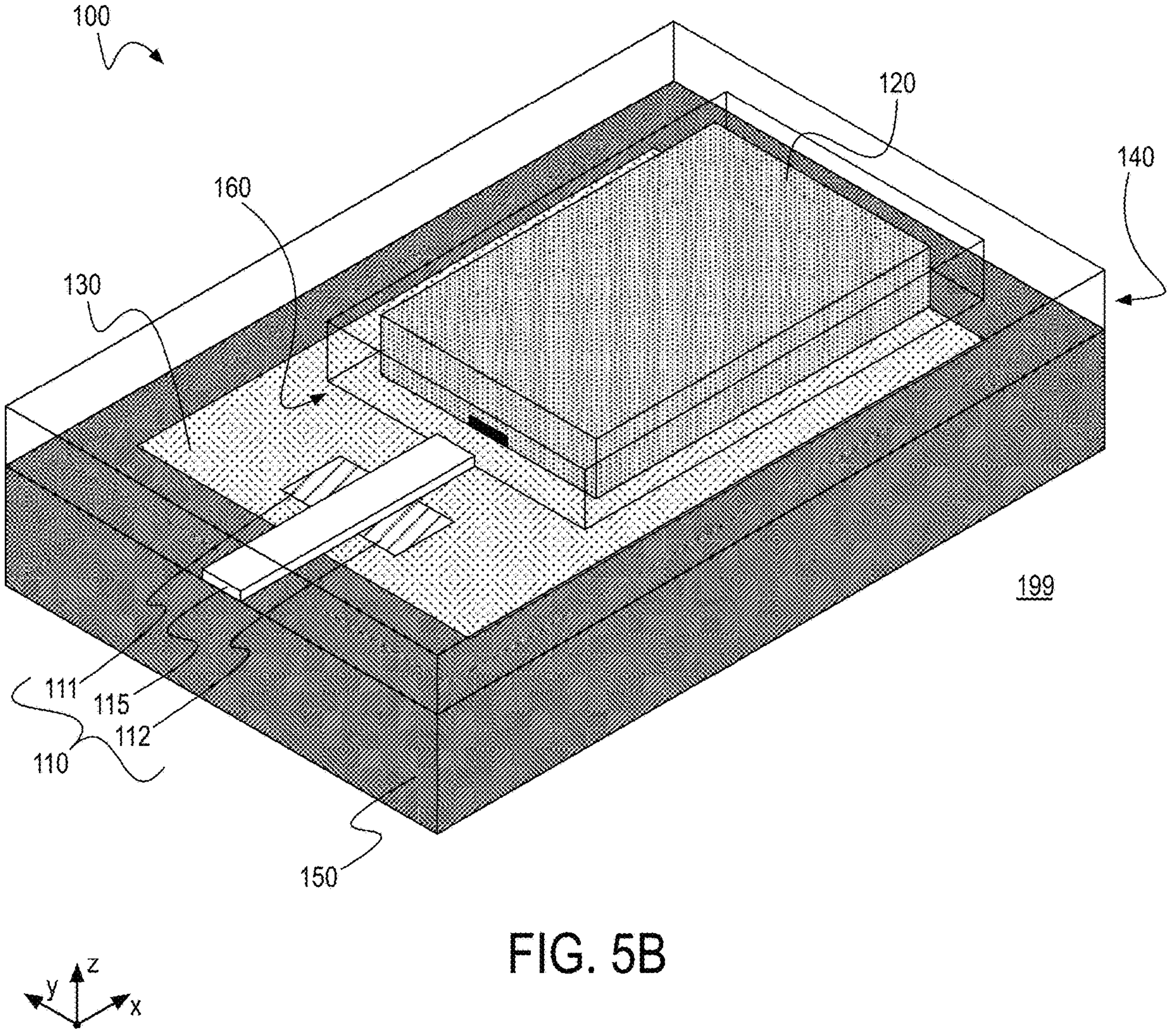

FIGS. 5A and 5B illustrate cross-sectional profile and isometric views of electro-optical IC module 100, including switchable waveguide device 110 and photonic and electrical ICs 120, 130, in accordance with some embodiments. The example of FIGS. 5A and 5B may share similarities with embodiments described elsewhere herein, e.g., FIGS. 1A and 1B. In the example of FIGS. 5A and 5B though, metallization structures 111, 112 are below nonlinear optical material 115, and metallization structures 111, 112 are included within electrical IC 130 rather than above electrical IC 130. Metallization structures 111, 112 are included within electrical IC 130 at or below upper surface 137 of electrical IC 130. Switchable waveguide device 110 also includes metallization structures 111, 112 and additionally includes nonlinear optical material 115. Nonlinear optical material 115 is on glass substrate 140 and over the portion of upper surface 137 of electrical IC 130 with metallization structures 111, 112. Nonlinear optical material 115 is between a portion of glass substrate 140 and over electrical IC 130. Glass substrate 140 is laterally adjacent PIC 120 and over electrical IC 130. Nonlinear optical material 115 (and so switchable waveguide device 110) is optically coupled to PIC 120. Metallization structures 111, 112 are below and on either side of nonlinear optical material 115. Voltage is delivered to metallization structures 111, 112 within electrical IC 130 by other conductive structures (not shown) within electrical IC 130. Electro-optical IC module 100 is coupled by electrical IC 130 to system substrate 199 at system surface 197, distal PIC 120. Module dielectric 150 is laterally adjacent electrical IC 130, and is between glass substrate 140 and system substrate 199.

Electric field lines (not shown), e.g., fringing field lines, flow above and below metallization structures 111, 112, though electric field may be densest directly between metallization structures 111, 112. Accordingly, a higher voltage (relative to switchable waveguide device 110 with nonlinear optical material 115 between, and at a same level, as metallization structures 111, 112) may be required to develop a same strength electric field in nonlinear optical material 115. However, glass substrate 140 without metallization structures 111, 112 may be produced more efficiently (e.g., more quickly and less expensively, due to less processing) than glass substrate 140 with metallization structures 111, 112.

Photonic and electrical ICs 120, 130 are direct bonded, e.g., at least by interconnect interfaces 128 on lower surface 127 of PIC 120 and interconnect interfaces 138 on that portion of upper surface 137 of electrical IC 130. In some embodiments, photonic and electrical ICs 120, 130 are hybrid bonded, e.g., at interconnect interfaces 128, 138, as well as by corresponding dielectric interfaces on surfaces 127, 137. In some such embodiments, nonlinear optical material 115 (laterally adjacent PIC 120, and on and coupled to glass substrate 140) is fusion bonded to a portion of upper surface 137 away from the portion of upper surface 137 direct bonded to PIC 120.

Transparent polymer 160 adjoins nonlinear optical material 115 and is laterally between nonlinear optical material 115 and PIC 120. In some embodiments, transparent polymer 160 has an index of refraction approximately equal to an index of refraction of nonlinear optical material 115. In some embodiments, transparent polymer 160 has an index of refraction approximately equal to an index of refraction of PIC 120. In some embodiments, nonlinear optical material 115 directly contacts (and optically couples to) PIC 120 with no transparent polymer 160 between them.

Figure 6A:
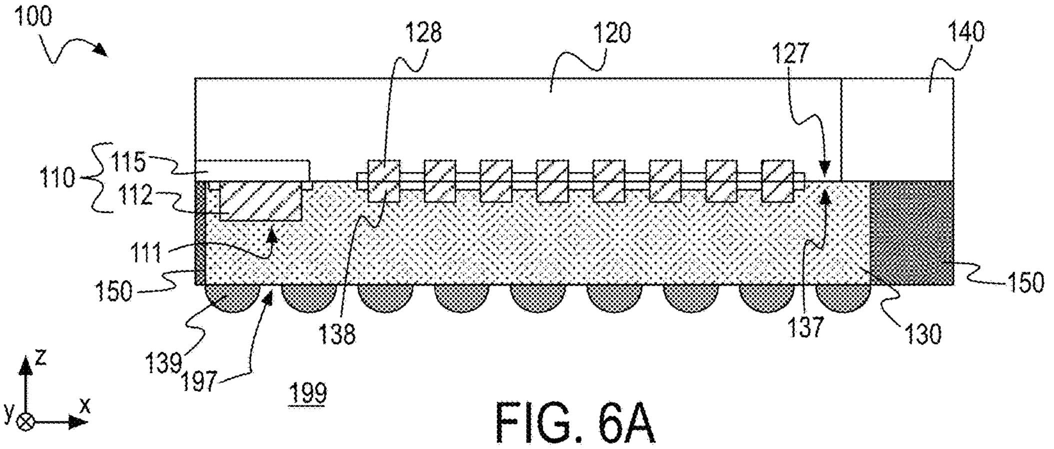
FIGS. 6A and 6B illustrate cross-sectional profile and isometric views of an electro-optical IC module, including a switchable waveguide device and photonic and electrical ICs.
Figure 6B:
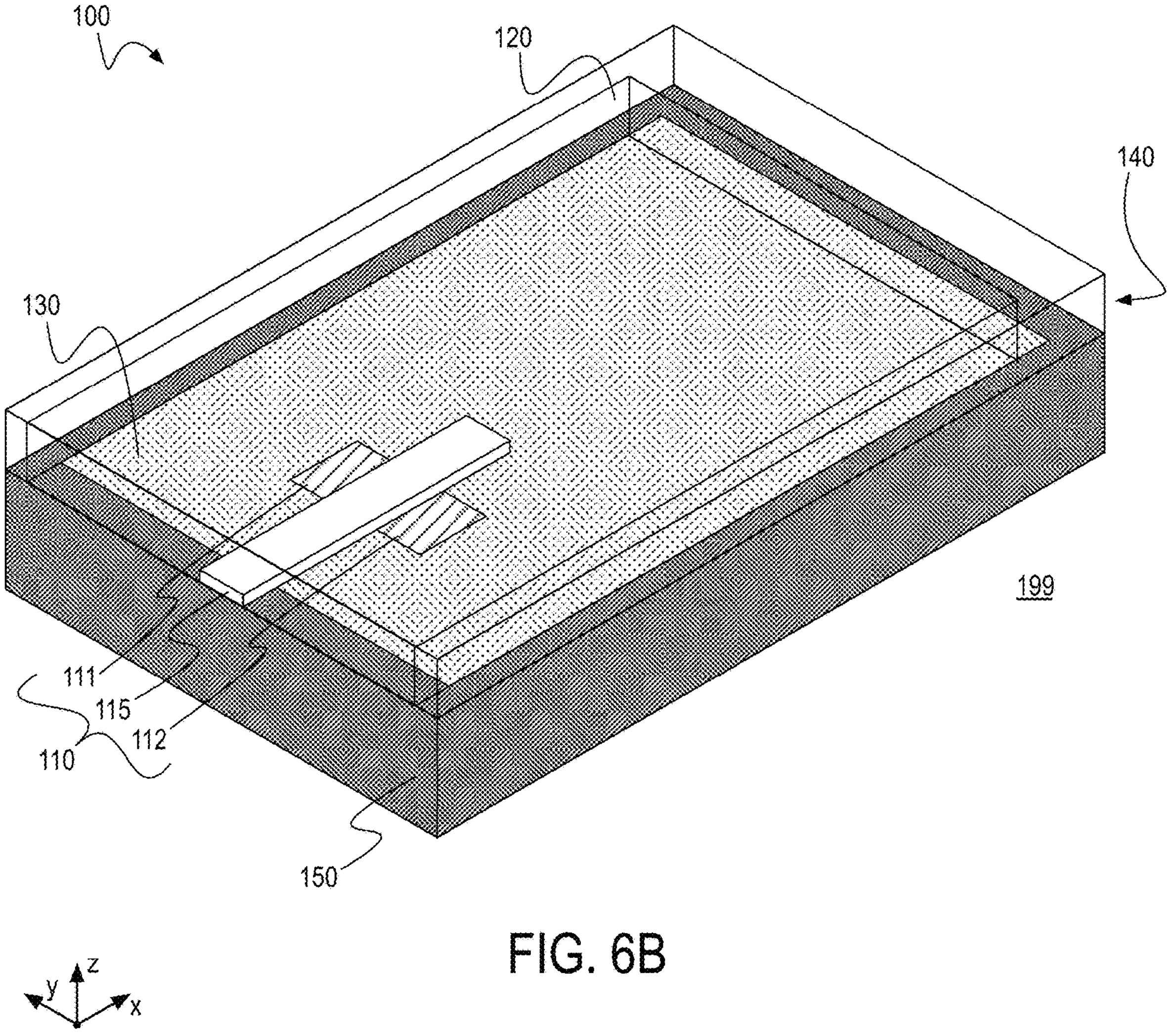

FIGS. 6A and 6B illustrate cross-sectional profile and isometric views of electro-optical IC module 100, including switchable waveguide device 110 and photonic and electrical ICs 120, 130, in accordance with some embodiments. The example of FIGS. 6A and 6B may share similarities with other described embodiments, e.g., FIGS. 2A and 2B. In the example of FIGS. 6A and 6B though, metallization structures 111, 112 are below nonlinear optical material 115, and metallization structures 111, 112 are included within electrical IC 130 rather than above electrical IC 130. Metallization structures 111, 112 are included within electrical IC 130 and a portion of upper surface 137 of electrical IC 130. Another portion of upper surface 137 is direct bonded to lower surface 127 of PIC 120. Switchable waveguide device 110 also includes metallization structures 111, 112 and additionally includes nonlinear optical material 115. PIC 120 includes nonlinear optical material 115, which is over the portion of upper surface 137 of electrical IC 130 with metallization structures 111, 112. Metallization structures 111, 112 are below and on either side of nonlinear optical material 115. Voltage is delivered to metallization structures 111, 112 within electrical IC 130 by other conductive structures (not shown) within electrical IC 130. Electro-optical IC module 100 is coupled by electrical IC 130 to system substrate 199 at system surface 197, distal PIC 120.

Module dielectric 150 is laterally adjacent electrical IC 130 and is between PIC 120 and system substrate 199, and between glass substrate 140 and system substrate 199.

Similar to the example of FIGS. 5A and 5B, with metallization structures 111, 112 in electrical IC 130, PIC 120 may be produced more efficiently (e.g., more quickly and less expensively, due to less processing) than PIC 120 with metallization structures 111, 112.

Photonic and electrical ICs 120, 130 are direct bonded, e.g., at least by interconnect interfaces 128, 138 on surfaces 127, 137. In some embodiments, photonic and electrical ICs 120, 130 are hybrid bonded, e.g., at interconnect interfaces 128, 138, as well as by dielectric interfaces on surfaces 127, 137. In some such embodiments, nonlinear optical material 115 (included on lower surface 127 of PIC 120) is fusion bonded to a portion of upper surface 137 away from the portion of upper surface 137 where interconnect interfaces 128, 138 are direct bonded.

Figure 7:
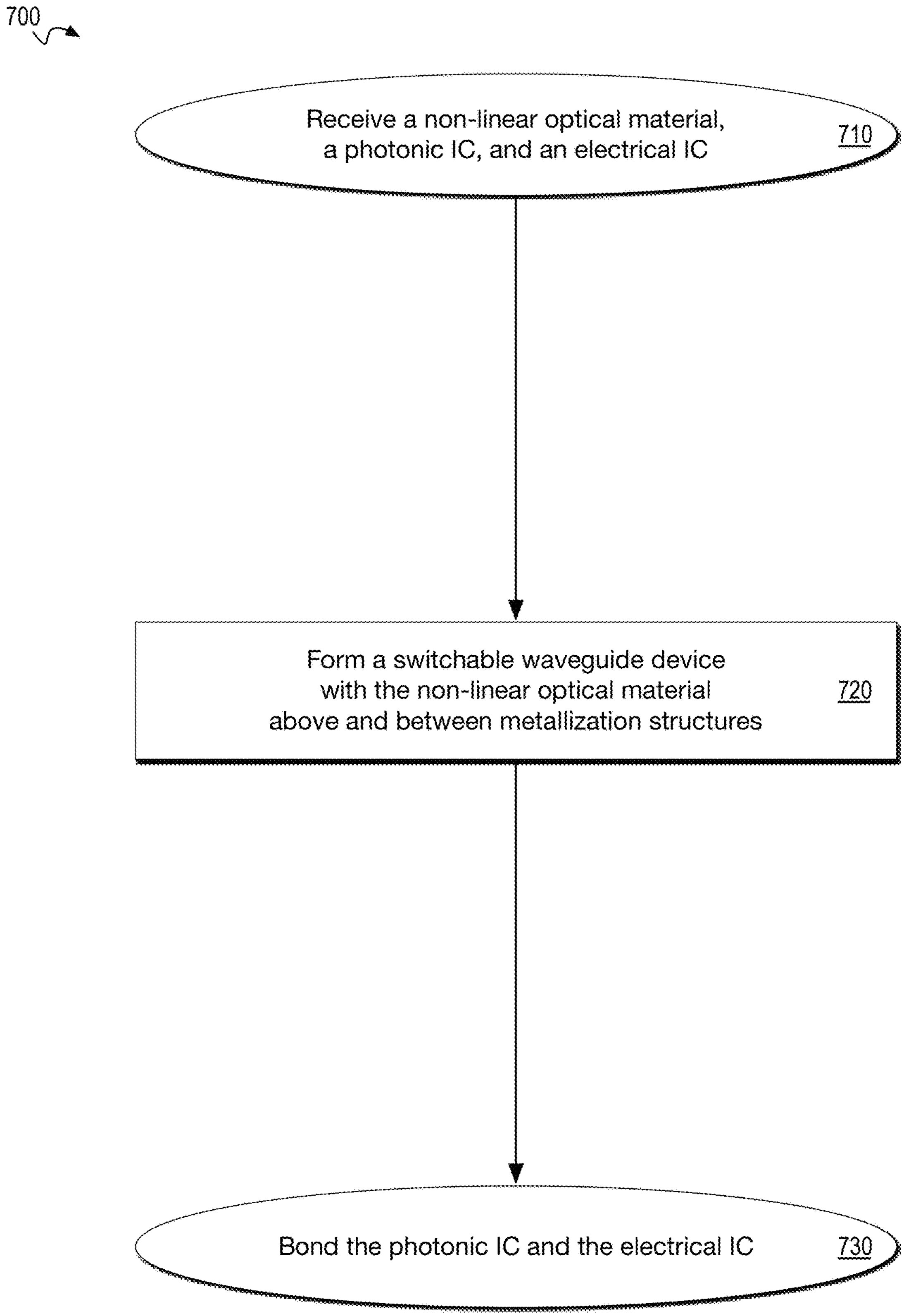
FIG. 7 illustrates various processes or methods for forming an electro-optical IC module, including a switchable waveguide device and photonic and electrical ICs.

FIG. 7 illustrates various processes or methods 700 for forming an electro-optical IC module, including a switchable waveguide device and photonic and electrical ICs, in accordance with some embodiments. FIG. 7 shows methods 700 that includes operations 710-730. Some operations shown in FIG. 7 may overlap with other operations. FIG. 7 shows an example sequence, but the operations can be done in other sequences as well, and some operations may be omitted. Some operations can also be performed multiple times before other operations are performed. Additional, optional operations will be described. Processes or methods 700 may share some similarities with other embodiments described herein, e.g., processes or methods 300. Methods 700 generally entail forming an electro-optical IC module by forming a switchable waveguide device with nonlinear optical material over and between metallization structures in an electrical IC, and bonding photonic and electrical ICs.

FIGS. 8A, 8B, 8C, 8D, and 8E illustrate cross-sectional profile views of electro-optical IC module 100, including switchable waveguide device 110 and photonic and electrical ICs 120, 130, at various stages of manufacture, in accordance with some embodiments.

Returning to FIG. 7, in operation 710, photonic and electrical ICs, and a nonlinear optical material are received. The electrical IC includes two metallization structures that, along with the nonlinear optical material, will be included in the switchable waveguide device. While the switchable waveguide device to be formed by processes or methods 700 will include two metallization structures also included in the electrical IC, the received nonlinear optical material, photonic and electrical ICs may be as previously described. For example, any previously described electrical IC may be used in processes or methods 700. In some embodiments, metallization structures in electrical IC are included in the switchable waveguide device that might previously have instead coupled to metallization structures in a switchable waveguide device (e.g., to deliver a voltage to the metallization structures in a switchable waveguide device). In some embodiments, a same nonlinear optical material as previously described is meant to be coupled to a same electrical IC as previously described and in a same position relative to the electrical IC as previously described (for example, with metallization structures in the electrical IC below and on either side of the nonlinear optical material). In some embodiments, a same PIC as previously described is meant to be coupled to a same electrical IC as previously described and is optically coupled to a same nonlinear optical material as previously described (for example, through a transparent polymer and in a glass substrate, where no metallization structures are on the glass substrate). In some embodiments, a glass substrate is received with the PIC coupled to the glass substrate, and a transparent polymer is formed between the photonic IC and the glass substrate, e.g., between the photonic IC and nonlinear optical material deposited on, or otherwise coupled to, the glass substrate. In some embodiments, a glass substrate is received not coupled to the PIC, and the PIC is then coupled to the glass substrate.

Figure 8A:
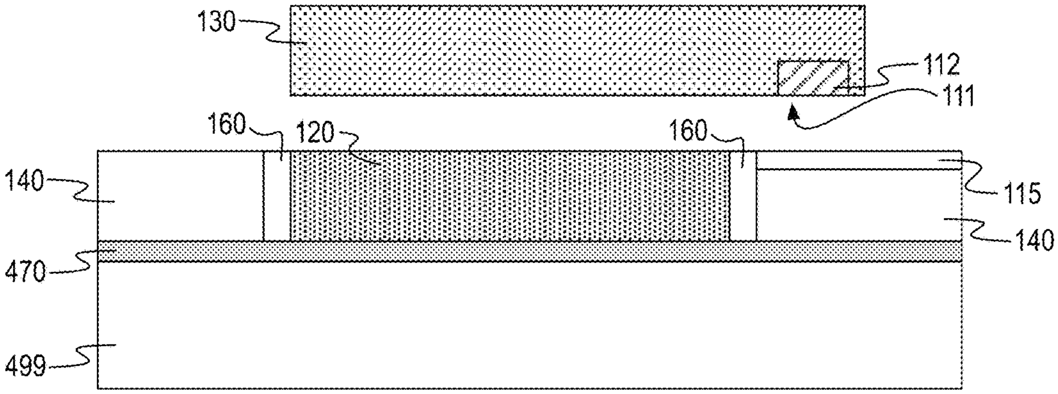
FIGS. 8A, 8B, 8C, 8D, and 8E illustrate cross-sectional profile views of an electro-optical IC module, including a switchable waveguide device and photonic and electrical ICs, at various stages of manufacture.

FIG. 8A shows an example received nonlinear optical material 115, metallization structures 111, 112, and photonic and electrical ICs 120, 130, e.g., after operation 710 of processes or methods 700. At least some of the received structures may be as described elsewhere herein. PIC 120 and electrical IC 130 are not coupled. While nonlinear optical material 115 is coupled to glass substrate 140, electrical IC 130 includes metallization structures 111, 112, which are not on glass substrate 140. Metallization structure 111 is behind (in the y direction) metallization structures 112, both included in electrical IC 130. Nonlinear optical material 115 is not at a same level as metallization structures 111, 112. Nonlinear optical material 115 and metallization structures 111, 112 are not coupled, and no switchable waveguide device is formed. Nonlinear optical material 115 is optically coupled to PIC 120 through transparent polymer 160. PIC 120 is coupled to glass substrate 140 by transparent polymer 160 between them. PIC 120 and glass substrate 140 are on carrier 499. PIC 120 and glass substrate 140 are coupled to carrier 499 by interface layer 470.

Returning to FIG. 7, a switchable waveguide device is formed in operation 720 with the nonlinear optical material over the metallization structures (and so the electrical IC die), where the metallization structures are below and on either side of the nonlinear optical material. In some embodiments, the switchable waveguide device is formed by coupling the nonlinear optical material, which is on the PIC, over the metallization structures (and the electrical IC), which includes direct bonding the photonic and electrical ICs. In some such embodiments, forming the switchable waveguide device includes depositing the nonlinear optical material on the PIC. In some embodiments, the switchable waveguide device is formed by coupling the nonlinear optical material, which is on a glass substrate, over the metallization structures (and the electrical IC), which includes direct bonding the photonic and electrical ICs. In some such embodiments, forming the switchable waveguide device includes depositing the nonlinear optical material on the glass substrate. In some embodiments, the switchable waveguide device is formed by directly bonding the nonlinear optical material, which is on a glass substrate, and/or the electrical IC to the PIC.

The photonic and electrical IC dies are direct bonded in operation 730. In some embodiments, the photonic and electrical ICs are hybrid bonded. Operation 730 of processes or methods 700 may share similarities with operation 330 of processes or methods 300. In operation 730, however, the metallization structures of the switchable waveguide device are included in the electrical IC without corresponding metallization structures (e.g., in the PIC or on a glass substrate) to bond to. In some embodiments, direct bonding the photonic and electrical ICs includes fusion bonding the nonlinear optical material to the electrical IC.

Figure 8B:
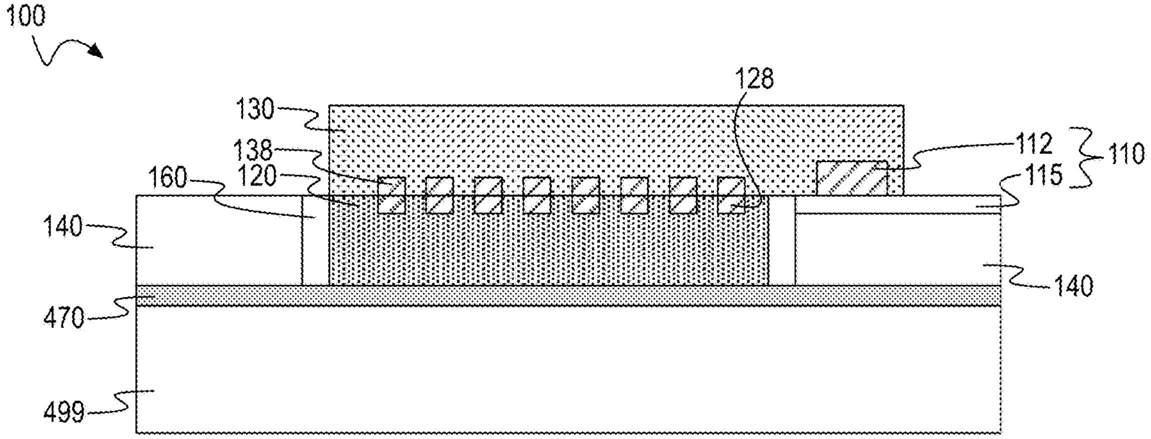

FIG. 8B shows electro-optical IC module 100 with direct bonded photonic and electrical ICs 120, 130. Photonic and electrical ICs 120, 130 are direct bonded at least at interconnect interfaces 128, 138. In some embodiments, photonic and electrical ICs 120, 130 are hybrid bonded. Photonic and electrical ICs 120, 130 may be fusion bonded at interconnect interfaces 128, 138, as well as at, e.g., dielectric interfaces between the metallization structures. Switchable waveguide device 110 includes nonlinear optical material 115 and vertically adjacent metallization structures 111, 112. Metallization structures 111, 112 are on either side of (and not at a same level as) nonlinear optical material 115.

Returning to FIG. 7, processes or methods 700 may further include forming a module dielectric over at least a portion of the electro-optical IC module, e.g., much as was previously described in processes or methods 300.

Figure 8C:
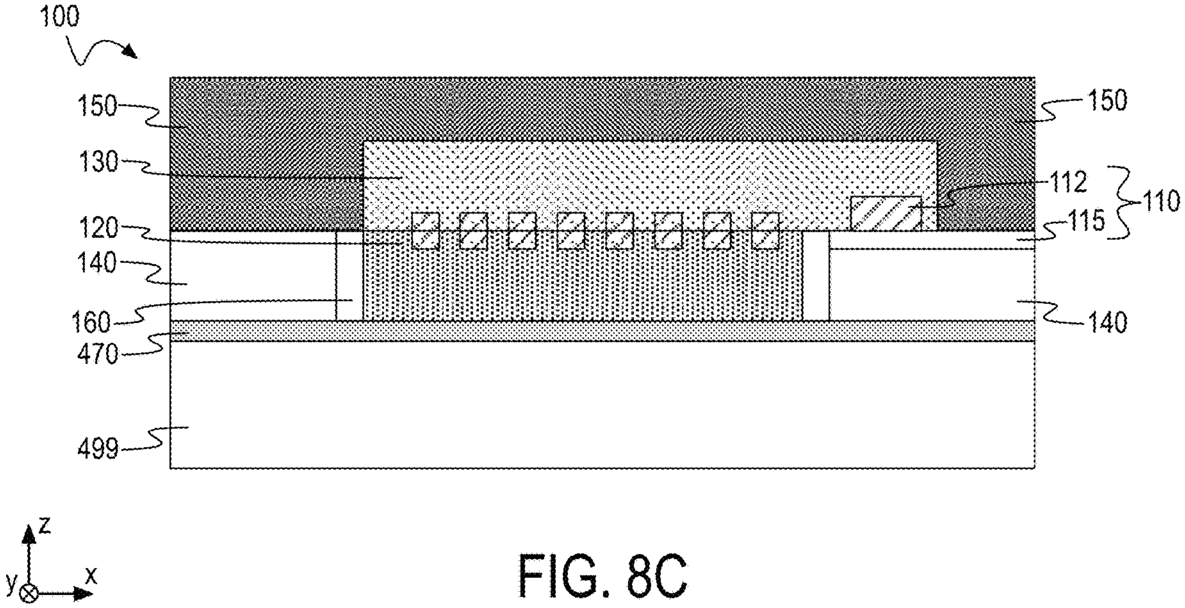

FIG. 8C shows module dielectric 150 over and encapsulating portions of electro-optical IC module 100, e.g., electrical IC 130. Module dielectric 150 is over electrical IC 130 (entirely covering the surface distal PIC 120) and at least portions of switchable waveguide device 110, glass substrate 140, and transparent polymer 160. Module dielectric 150 may be coupled to, e.g., glass substrate 140 and may insulate electrical IC 130 and protect it (and its bonded connections) from moisture, etc. In some embodiments, module dielectric 150 covers, insulates, and protects other portions of electro-optical IC module 100.

Returning to FIG. 7, processes or methods 700 for forming an electro-optical IC module may further include planarizing one or more surfaces of the electro-optical IC module, e.g., by a CMP. A CMP may planarize a module dielectric or other materials or surfaces.

Figure 8D:
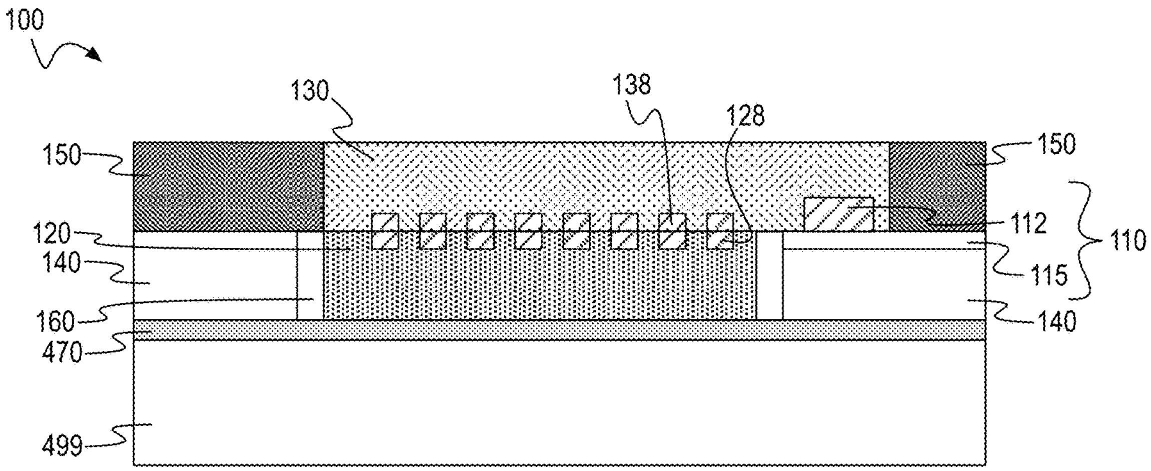

FIG. 8D shows electro-optical IC module 100 with electrical IC 130 having an exposed surface distal PIC 120 and module dielectric 150 on both sides. In some embodiments, module dielectric 150 has been planarized, e.g., by CMP, down to have a substantially coplanar surface with electrical IC 130 distal PIC 120. The exposed surface of electrical IC 130 distal PIC 120 is available for bonding (and electrically connecting), e.g., to system substrate 199.

Returning to FIG. 7 and processes or methods 700, processing may further include decoupling the electro-optical IC module from a carrier, forming or preparing interconnect interfaces on a surface of the electro-optical IC module, and singulating the electro-optical IC module, all substantially as described in the processes or methods 300.

Figure 8E:
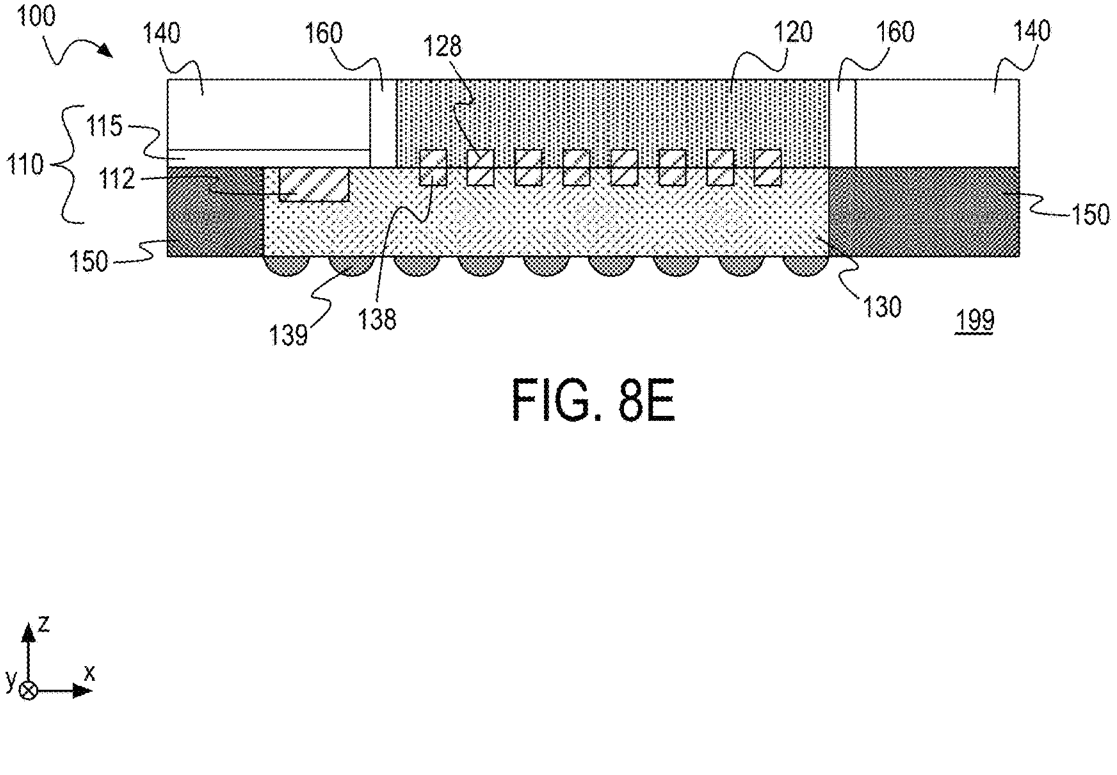

FIG. 8E shows electro-optical IC module 100 not coupled to any carrier 499. An upper surface of PIC 120, glass substrate 140, and transparent polymer 160 are exposed and substantially coplanar. A lower surface of electrical IC 130 and module dielectric 150 are exposed and substantially coplanar. System interconnect interfaces 139 on the lower surface of electrical IC 130 are coupled to system substrate 199.

Switchable waveguide device 110 includes nonlinear optical material 115 laterally between but vertically above metallization structures 111, 112. Metallization structures 111, 112 are on either side of, and below, nonlinear optical material 115.

Figure 9A:
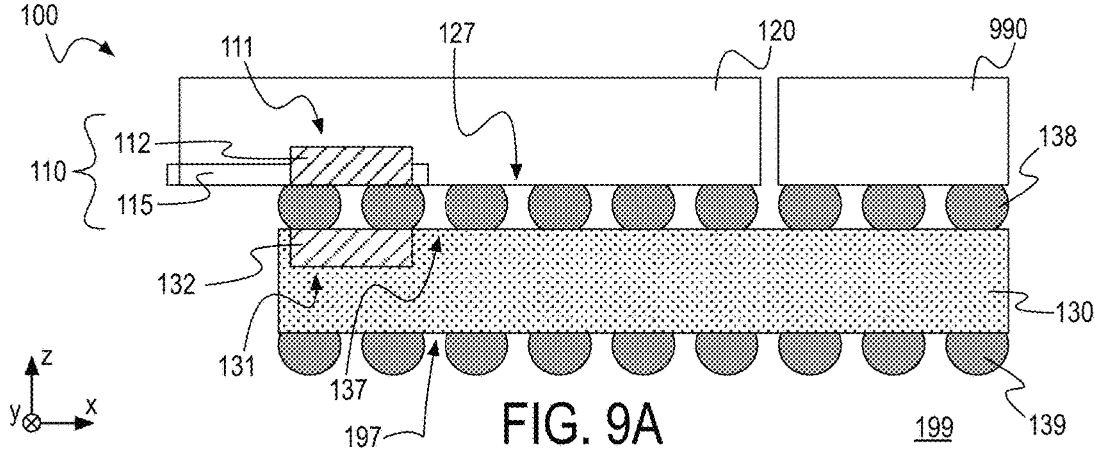
FIGS. 9A and 9B illustrate cross-sectional profile and isometric views of an electro-optical IC module, including a switchable waveguide device and photonic and electrical ICs.
Figure 9B:
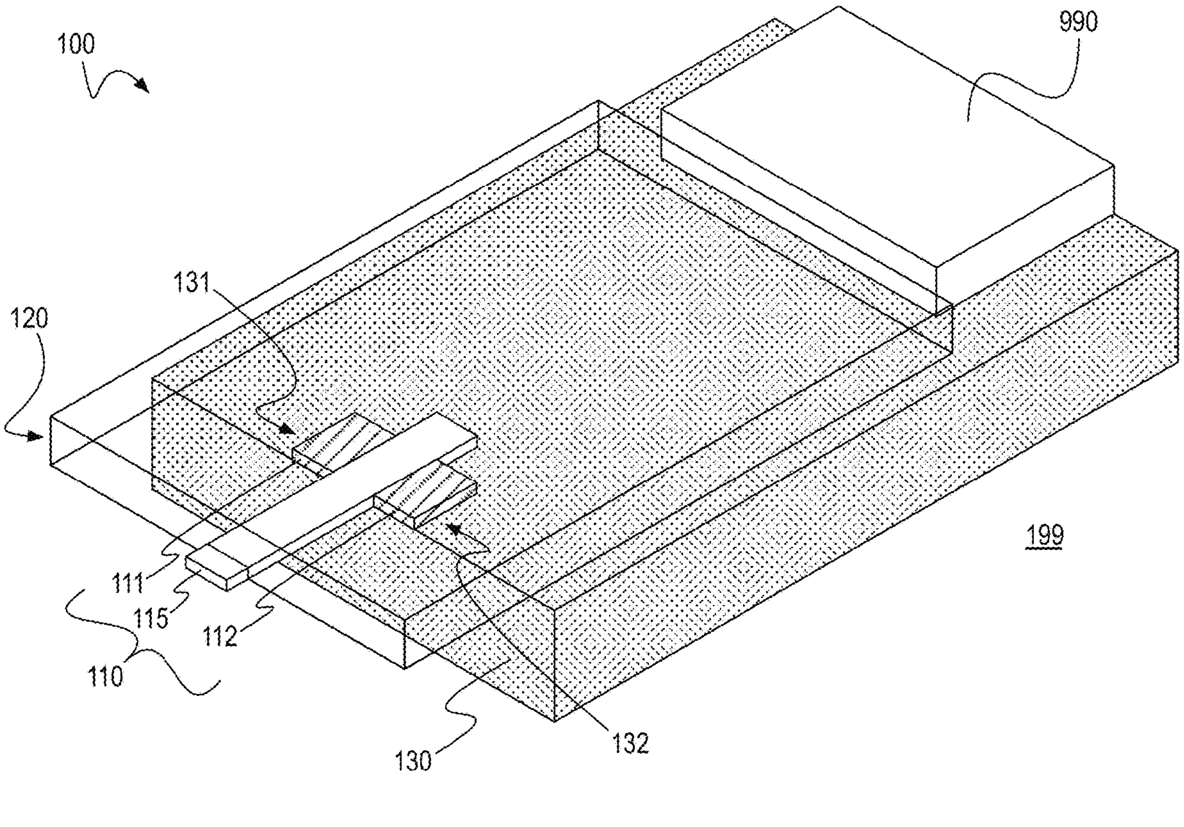

FIGS. 9A and 9B illustrate cross-sectional profile and isometric views of electro-optical IC module 100, including switchable waveguide device 110 and photonic and electrical ICs 120, 130, in accordance with some embodiments. Electro-optical IC module 100 includes three IC dies, PIC 120 and microcontroller 990 directly bonded to electrical IC 130, and switchable waveguide device 110 (which includes nonlinear optical material 115 and first and second metallization structures 111, 112) optically coupled to PIC 120. Nonlinear optical material 115 is at a same level and between first and second metallization structures 111, 112. Switchable waveguide device 110 is over electrical IC 130. First and second metallization structures 111, 112 are over, and coupled to, metallization structures 131, 132 in electrical IC 130. PIC 120 is over electrical IC 130. Electro-optical IC module 100 is coupled by electrical IC 130 (and system interconnect interfaces 139 on system surface 197, distal PIC 120) to system substrate 199. PIC 120 is shown as transparent, but some components (e.g., solder bond pads or other interconnect interfaces of ICs 120, 130) are left unshown (e.g., in FIG. 9B) for illustrative purposes.

Photonic and electrical ICs 120, 130 may be bonded by solder connections. For example, in some embodiments, lower surface 127 of PIC 120 is soldered to a portion of upper surface 137 of electrical IC 130. Metallization structures 111, 112 may be bond pads on either side of nonlinear optical material 115. In some embodiments, a discrete switchable waveguide device 110 includes nonlinear optical material 115 coupled to metallization structures 111, 112 (not included in either PIC 120 or electrical IC 130). In some such embodiments, metallization structure 111 is soldered to metallization structure 131, and metallization structure 112 is soldered to metallization structure 132. In some embodiments, PIC 120 includes metallization structures 111, 112, and a discrete nonlinear optical material 115 is between, and coupled to both of, PIC 120 and electrical IC 130. In some embodiments, electrical IC 130 is soldered to system substrate 199 at system interconnect interfaces 139. Microcontroller 990 may also be soldered to electro-optical IC module 100, e.g., to electrical IC 130 at another portion of upper surface 137. In some embodiments, electro-optical IC module 100 does not include an integrated microcontroller 990. Soldering components of electro-optical IC module 100, e.g., ICs 120, 130, may allow for the use of other components, for example, discrete components that may not be hybrid bonded (or that would be more difficult to hybrid bond) to ICs 120, 130. Discrete components may be components, e.g., nonlinear optical material 115, manufactured separately from, e.g., ICs 120, 130.

In some embodiments, switchable waveguide device 110 is a discrete component coupled between ICs 120, 130, e.g., in a void or cavity in PIC 120. In some such embodiments, switchable waveguide device 110 is soldered to one or both of ICs 120, 130. In other embodiments, nonlinear optical material 115 is a discrete component coupled to and between ICs 120, 130, while metallization structures 111, 112 are included within PIC 120. In the example of FIG. 9B, nonlinear optical material 115 is shown as a substantially right rectangular prism in a right rectangular cavity in PIC 120 and optically coupled to PIC 120. Nonlinear optical material 115 is longer than the cavity and extends beyond a sidewall of PIC 120. In some embodiments, nonlinear optical material 115 is shorter than the cavity. In some embodiments, nonlinear optical material 115 is included and integrated within PIC 120, and an end of nonlinear optical material 115 is substantially coplanar with a sidewall of PIC 120.

Nonlinear optical material 115 may have other shapes. Nonlinear optical material 115 may be coupled to electro-optical IC module 100 in a cavity, e.g., in PIC 120, having another shape. Such shapes may allow for (or improve) coupling, including optical coupling, of external optical lines to electro-optical IC module 100. In some embodiments, metallization structures 111, 112 are immediately adjacent, and on either side of, a cavity for coupling nonlinear optical material 115 to PIC 120. Metallization structures 111, 112 may have a same height as the cavity and/or nonlinear optical material 115.

Figure 10A:
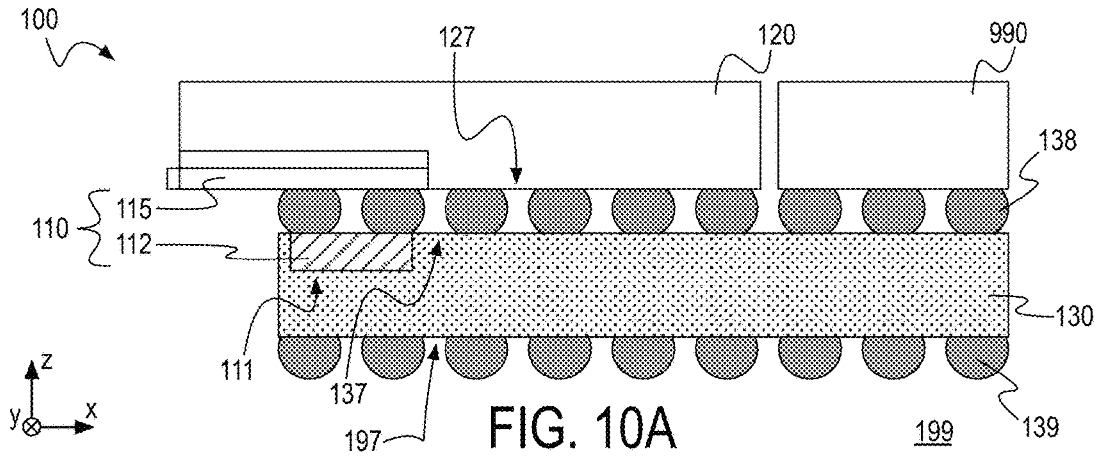
FIGS. 10A and 10B illustrate cross-sectional profile and isometric views of an electro-optical IC module, including a switchable waveguide device and photonic and electrical ICs.
Figure 10B:
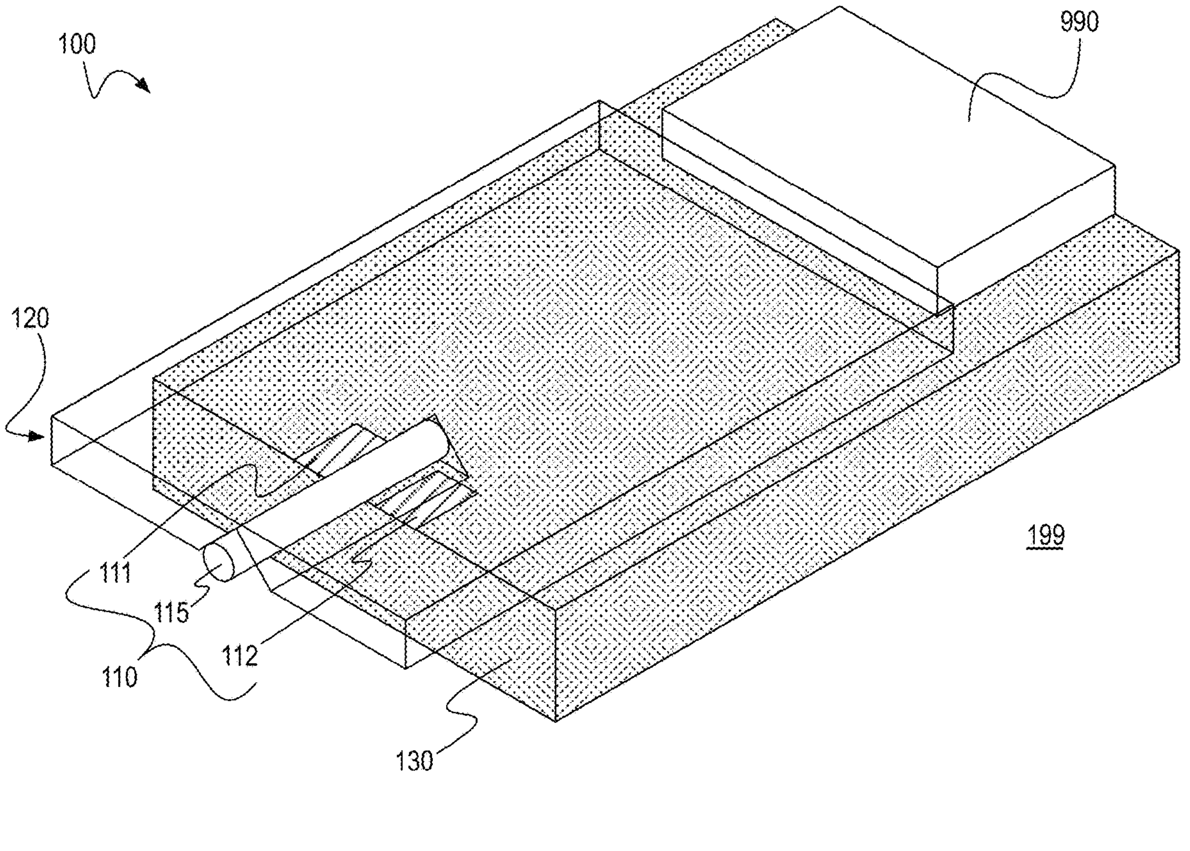

FIGS. 10A and 10B illustrate cross-sectional profile and isometric views of electro-optical IC modules 100, including switchable waveguide device 110 and photonic and electrical ICs 120, 130, in accordance with some embodiments. Electro-optical IC module 100 includes three IC dies, PIC 120 and microcontroller 990 directly bonded to electrical IC 130, and switchable waveguide device 110 (which includes nonlinear optical material 115 and first and second metallization structures 111, 112) optically coupled to PIC 120. PIC 120 is over electrical IC 130. Nonlinear optical material 115 is over first and second metallization structures 111, 112, which are both in electrical IC 130. Metallization structures 111, 112 are below and on either side of nonlinear optical material 115. Electro-optical IC module 100 is coupled by electrical IC 130 (and system interconnect interfaces 139 on system surface 197, distal PIC 120) to system substrate 199.

FIGS. 10A and 10B may share similarities with, e.g., FIGS. 9A and 9B. For example, photonic and electrical ICs 120, 130 may be bonded by solder connections. In some embodiments, lower surface 127 of PIC 120 is soldered to a portion of upper surface 137 of electrical IC 130. In some embodiments, electrical IC 130 is soldered to system substrate 199 at system interconnect interfaces 139 on system surface 197, distal PIC 120.

In FIGS. 10A and 10B though, metallization structures 111, 112 are in electrical IC 130 without corresponding metallization structures above to bond to. Forgoing extraneous metallization structures, e.g., in PIC 120, may allow for quicker, more efficient (e.g., higher throughput), and cheaper processing, for example, without extra operations depositing metals. Forgoing extraneous metallization structures may allow for using manufacturing flows, e.g., for PIC 120, that might not otherwise be used (if those metallization structures were required).

In some embodiments, nonlinear optical material 115 is included and integrated within PIC 120. In the example of FIGS. 10A and 10B, switchable waveguide device 110 is a discrete component coupled between ICs 120, 130 in a cavity in PIC 120. Nonlinear optical material 115 is cylindrical and coupled to electro-optical IC module 100 in a V-groove cavity (e.g., having the shape of a triangular prism) in PIC 120. Other shapes may be used. Such shapes may allow for (or improve) coupling, including optical coupling, of external optical lines to electro-optical IC module 100. In some embodiments, a discrete nonlinear optical material 115 with a rectangular cross-section is coupled to PIC 120 in a matching cavity in PIC 120. In some embodiments, a discrete, substantially cylindrical nonlinear optical material 115 is optically coupled to PIC 120 in a V-groove cavity in PIC 120, where nonlinear optical material 115 is shorter than the cavity, and a substantially cylindrical optical fiber (or other optical waveguide) is also in the V-groove cavity in PIC 120 and is optically coupled to nonlinear optical material 115.

Figure 11:
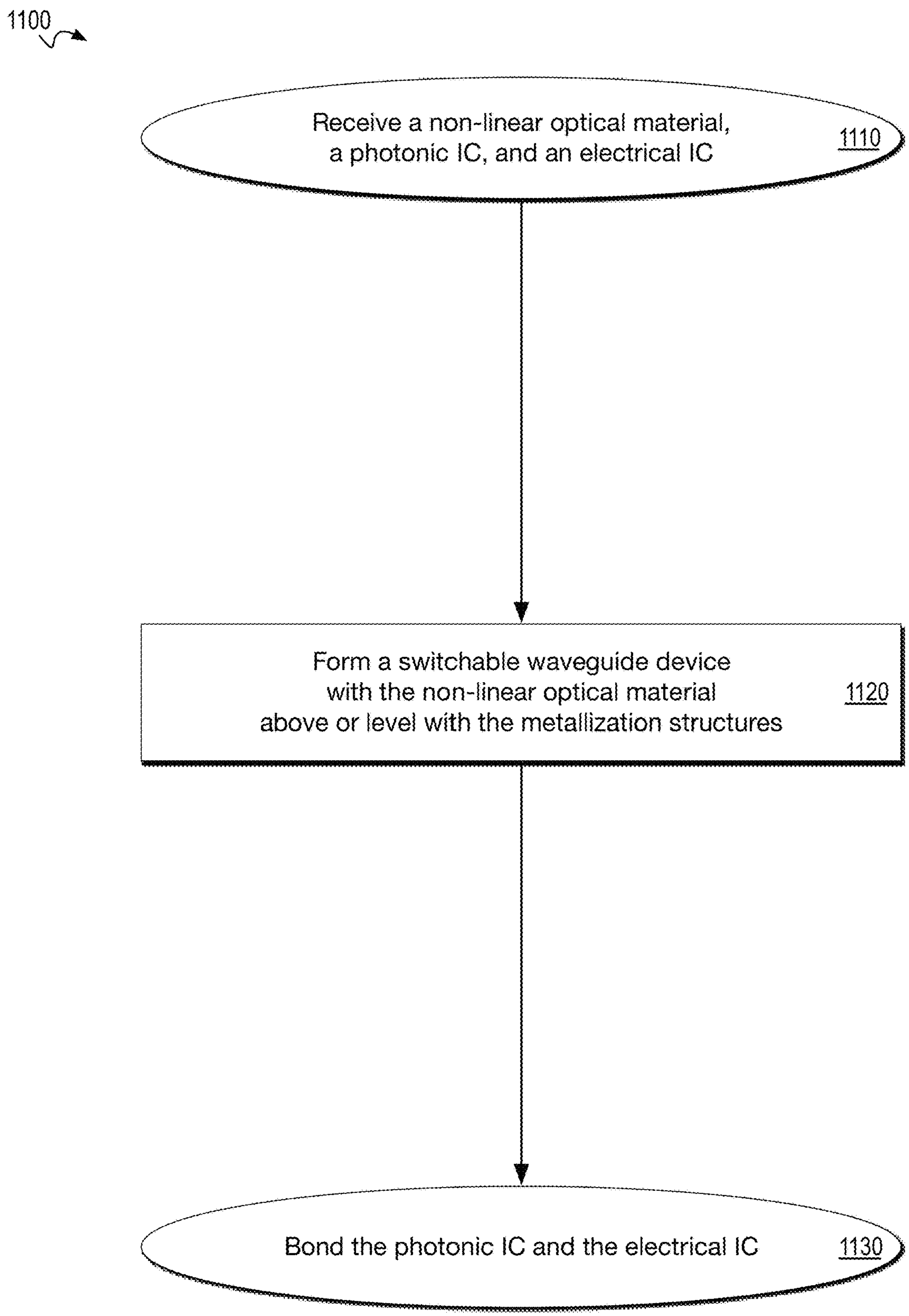
FIG. 11 illustrates various processes or methods for forming an electro-optical IC module, including a switchable waveguide device and photonic and electrical ICs.

FIG. 11 illustrates various processes or methods 1100 for forming an electro-optical IC module, including a switchable waveguide device and photonic and electrical ICs, in accordance with some embodiments. FIG. 11 shows methods 1100 that includes operations 1110-1130. Some operations shown in FIG. 11 may overlap with other operations. FIG. 11 shows an example sequence, but the operations can be done in other sequences as well, and some operations may be omitted. Some operations can also be performed multiple times before other operations are performed. Additional, optional operations will be described. Processes or methods 100 may share some similarities with other embodiments described herein, e.g., processes or methods 300 or 700. Methods 1100 generally entail forming an electro-optical IC module by forming a switchable waveguide device with metallization structures on either side of, and either below or at a same level with, nonlinear optical material over an electrical IC, and bonding photonic and electrical ICs.

Returning to FIG. 11, in operation 1110, photonic and electrical ICs, and a nonlinear optical material are received. The received nonlinear optical material, photonic and electrical ICs may be substantially as previously described. For example, a PIC and nonlinear optical material meant to be deposited on the PIC may be received. Photonic and electrical ICs including metallization structures as previously described may be received. For example, metallization structures meant for developing an electric field in a switchable waveguide device may be included in either of the photonic and electrical ICs. The electrical IC may include metallization structures meant to develop an electric field in a switchable waveguide device or meant to couple (and deliver voltage) to metallization structures in a switchable waveguide device.

In some embodiments, nonlinear optical material is received as a discrete component meant for coupling to the electro-optical IC module between the photonic and electrical ICs. In some such embodiments, one or both of the photonic and electrical ICs may have a cavity meant to accept the received nonlinear optical material.

A switchable waveguide device is formed in operation 1120 with the nonlinear optical material over or at a same level as the metallization structures, with the metallization structures on either side of the nonlinear optical material. In some embodiments, the PIC includes the metallization structures, and the switchable waveguide device is formed by depositing nonlinear optical material on the PIC at a same level as, and between, the metallization structures. In some embodiments, the PIC includes the metallization structures, and the switchable waveguide device is formed by coupling the nonlinear optical material to the PIC, e.g., in a cavity in the PIC, at a same level as, and between, the metallization structures. In some embodiments, the nonlinear optical material is on the PIC, and the switchable waveguide device is formed by coupling the PIC (including the nonlinear optical material) over and to the electrical IC, which includes the metallization structures on either side of the nonlinear optical material. In some such embodiments, forming the switchable waveguide device includes depositing the nonlinear optical material on the PIC. In some embodiments, coupling the PIC (including nonlinear optical material on the PIC) over and to the electrical IC includes soldering (or otherwise bonding) the photonic and electrical ICs. In some embodiments, the electrical IC includes the metallization structures, the nonlinear optical material is a discrete component, and the switchable waveguide device is formed by coupling the nonlinear optical material to the electrical IC such that the nonlinear optical material is over the metallization structures, and the metallization structures are on either side of the nonlinear optical material. In some such embodiments, the nonlinear optical material is coupled between the photonic and electrical ICs, e.g., in a cavity in the PIC, as the photonic and electrical ICs are directly bonded.

The photonic and electrical IC dies are directly bonded in operation 1130. In some embodiments, the photonic and electrical ICs are soldered together at interconnect interfaces, such as bond pads or other metallization structures. In some such embodiments, at least some of the interconnect interfaces are electrical connections between the photonic and electrical ICs. In some embodiments, the PIC includes the metallization structures of the switchable waveguide device, and directly bonding the photonic and electrical ICs includes soldering the metallization structures of the switchable waveguide device (and the PIC) to corresponding metallization structures in the electrical IC.

Figure 12A:
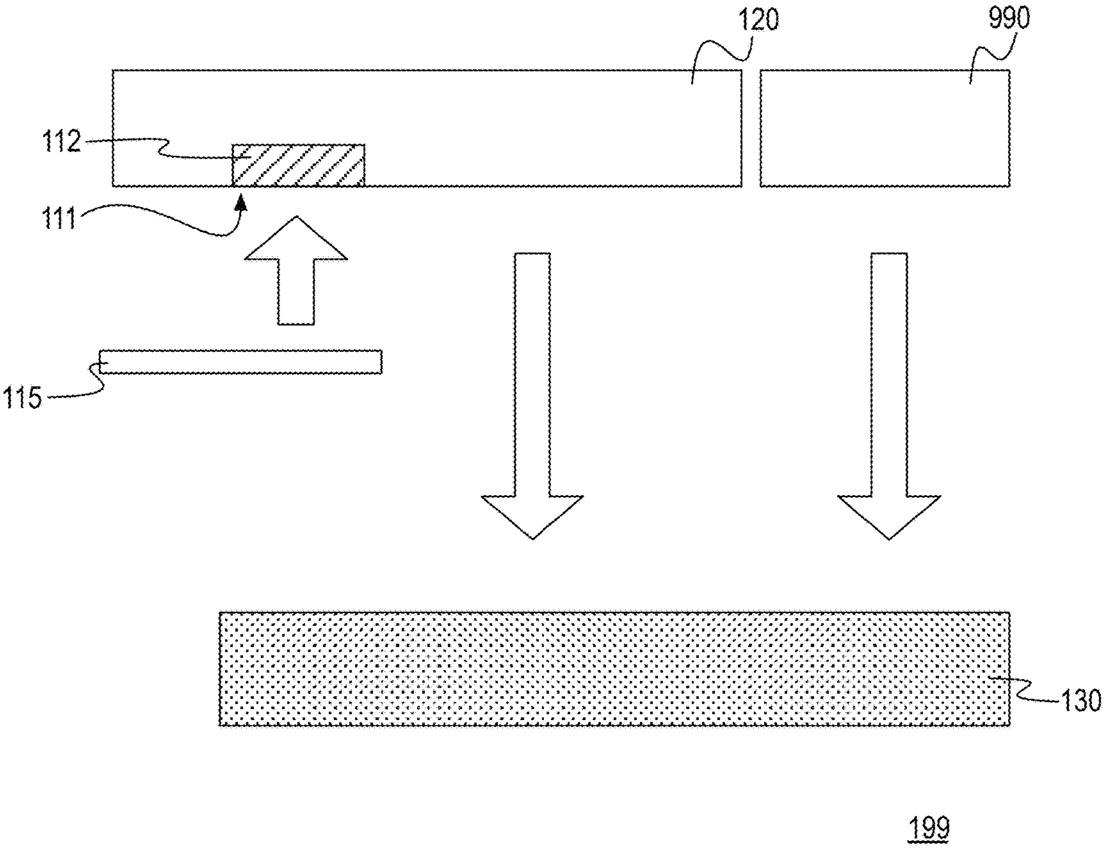
FIGS. 12A and 12B illustrate cross-sectional profile views of an electro-optical IC module, including a switchable waveguide device and photonic and electrical ICs, at various stages of manufacture.
Figure 12B:
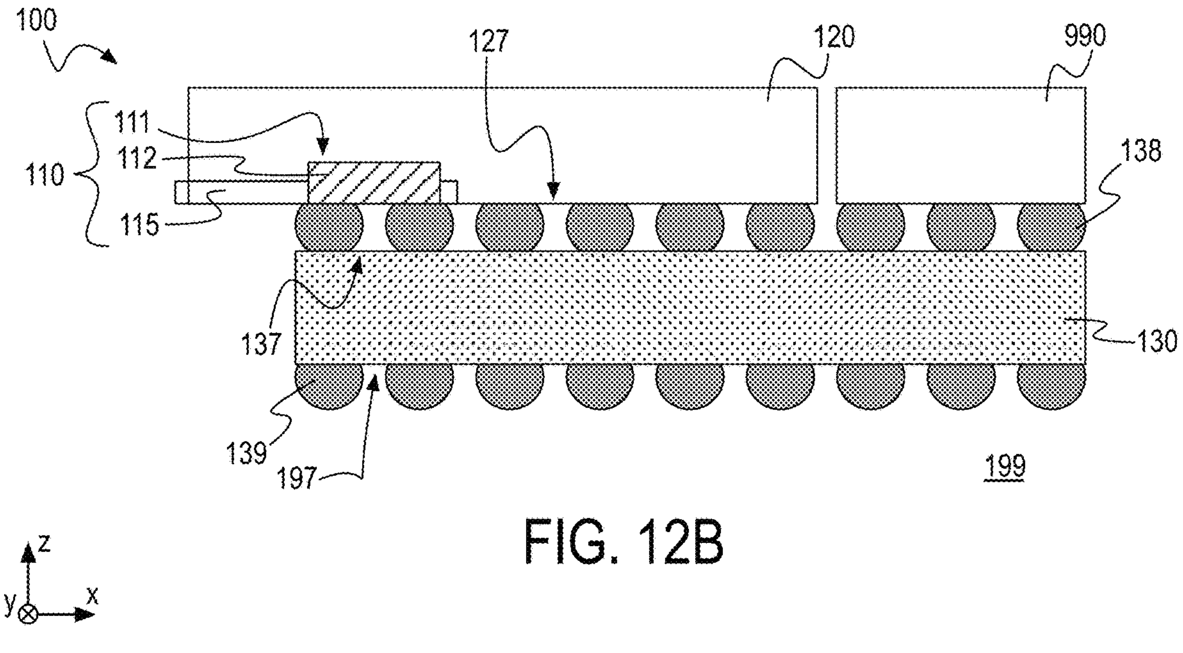

FIGS. 12A and 12B illustrate cross-sectional profile views of electro-optical IC module 100, including switchable waveguide device 110 and photonic and electrical ICs 120, 130, at various stages of manufacture, in accordance with some embodiments. FIG. 12A shows nonlinear optical material 115, photonic and electrical ICs 120, 130, for example, as received in processes or methods 1100, as well as microcontroller 990 and system substrate 199. PIC 120 includes metallization structures 111, 112. In some embodiments, nonlinear optical material 115 is a layer deposited on PIC 120 between metallization structures 111, 112. In some embodiments, nonlinear optical material 115 is a discrete component coupled to PIC 120, e.g., in a cavity between metallization structures 111, 112. In some such embodiments, nonlinear optical material 115 is substantially cylindrical. In some embodiments, nonlinear optical material 115 has a substantially rectangular cross-sectional area. In some embodiments, nonlinear optical material 115 is another shape.

FIG. 12B shows electro-optical IC module 100 with PIC 120 directly bonded to electrical IC 130 with metallization structures on lower surface 127 of PIC 120 soldered to metallization structures on a corresponding portion of upper surface 137 of electrical IC 130. Metallization structures on another portion of upper surface 137 of electrical IC 130 are soldered to corresponding metallization structures on microcontroller 990. Metallization structures 111, 112 in PIC 120 are soldered to corresponding metallization structures in electrical IC 130. Electro-optical IC module 100 and electrical IC 130 are soldered to system substrate 199 at system interconnect interfaces 139 on system surface 197, distal PIC 120.

Figure 13A:
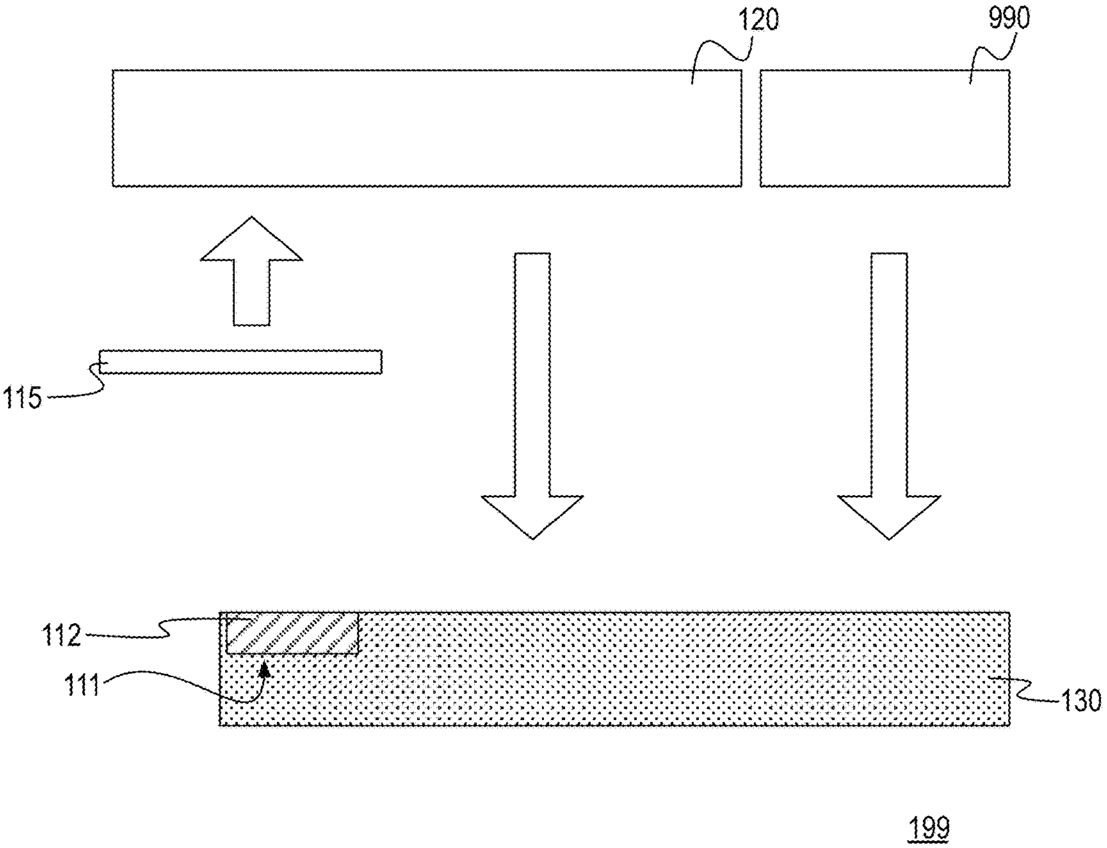
FIGS. 13A and 13B illustrate cross-sectional profile views of an electro-optical IC module, including a switchable waveguide device and photonic and electrical ICs, at various stages of manufacture.
Figure 13B:
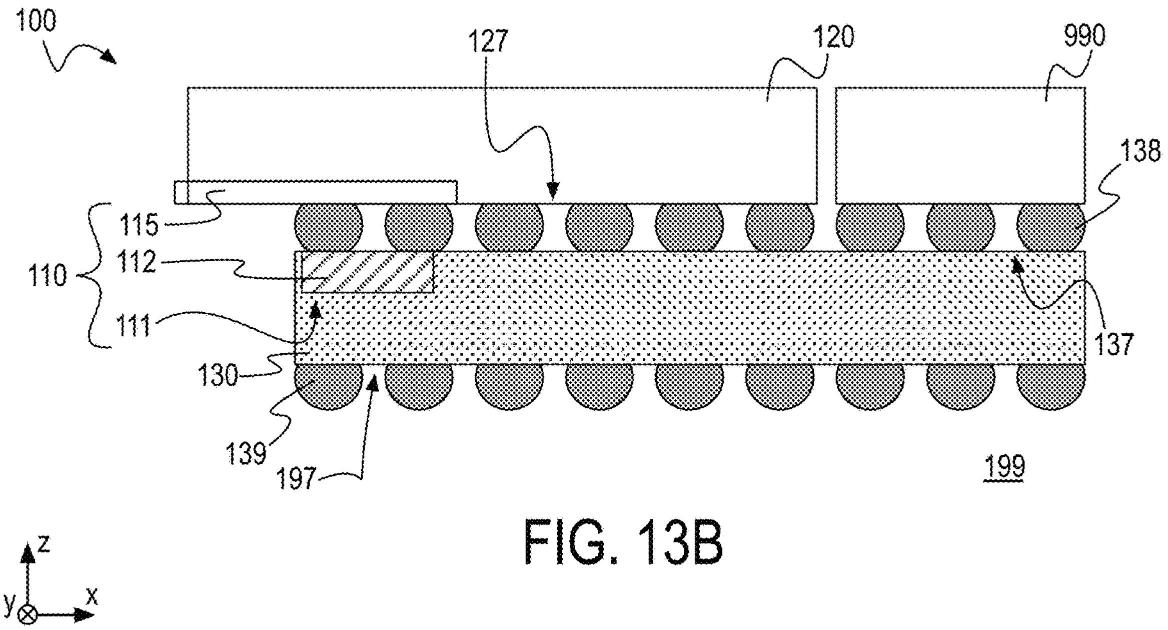

FIGS. 13A and 13B illustrate cross-sectional profile views of electro-optical IC module 100, including switchable waveguide device 110 and photonic and electrical ICs 120, 130, at various stages of manufacture, in accordance with some embodiments. FIG. 13A shows nonlinear optical material 115, photonic and electrical ICs 120, 130, for example, as received in processes or methods 1100, as well as microcontroller 990 and system substrate 199. Electrical IC 130 includes metallization structures 111, 112. In some embodiments, nonlinear optical material 115 is a layer deposited on PIC 120 and meant to be coupled over metallization structures 111, 112 and electrical IC 130. In some embodiments, nonlinear optical material 115 is a discrete component coupled to PIC 120, e.g., in a cavity. In some such embodiments, nonlinear optical material 115 is substantially cylindrical. In some embodiments, nonlinear optical material 115 has a substantially rectangular cross-sectional area. In some embodiments, nonlinear optical material 115 is another shape.

FIG. 13B shows electro-optical IC module 100 with PIC 120 directly bonded to electrical IC 130 with metallization structures on lower surface 127 of PIC 120 soldered to metallization structures on a corresponding portion of upper surface 137 of electrical IC 130. Metallization structures on another portion of upper surface 137 of electrical IC 130 are soldered to corresponding metallization structures on microcontroller 990. Metallization structures 111, 112 in electrical IC 130 are not soldered to PIC 120. Electro-optical IC module 100 and electrical IC 130 are soldered to system substrate 199 at system interconnect interfaces 139 on system surface 197, distal PIC 120.

Figure 14:
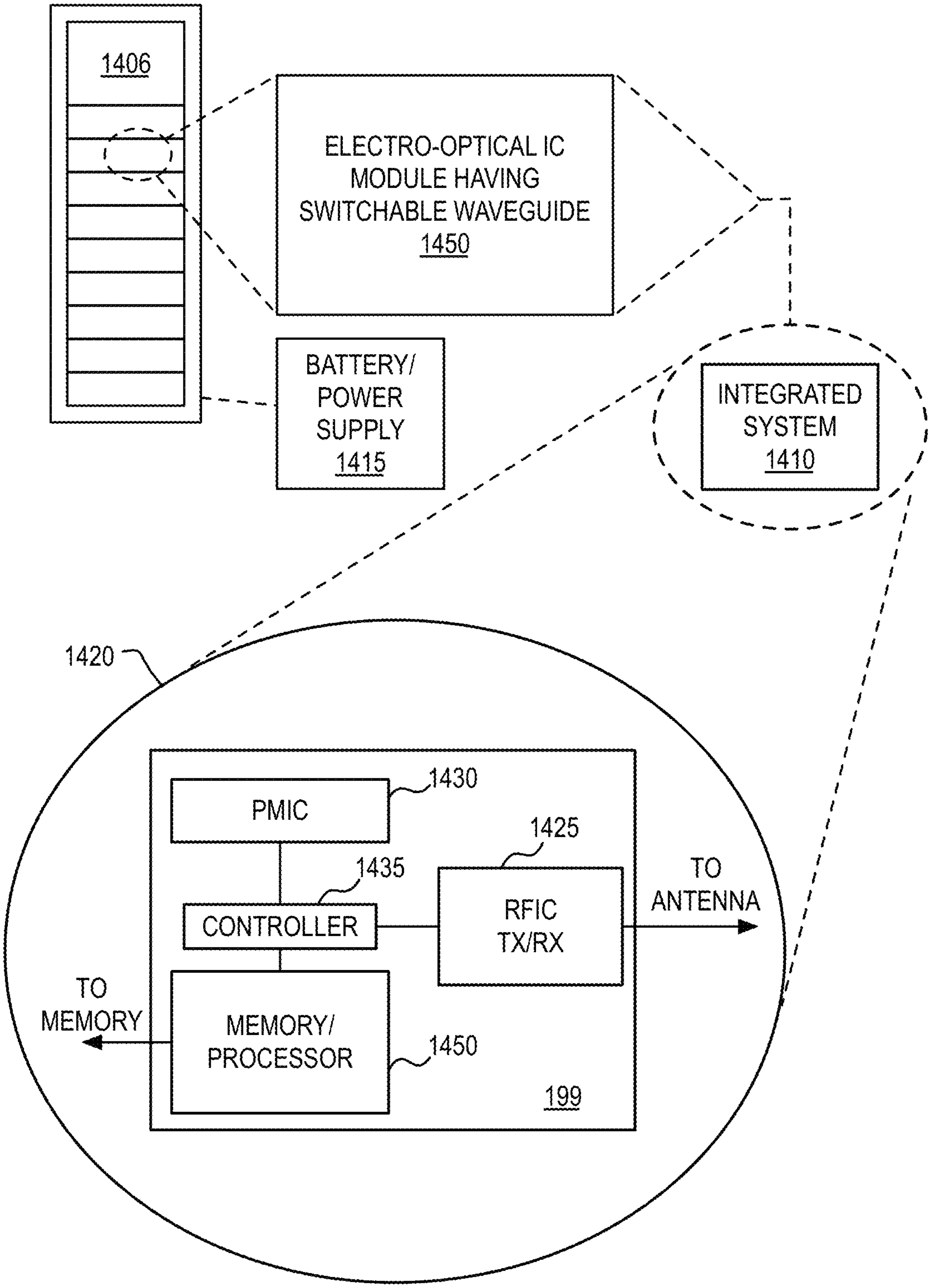
FIG. 14 illustrates a diagram of an example data server machine employing an electro-optical IC module having photonic and electrical ICs and an integrated switchable waveguide device.

FIG. 14 illustrates a diagram of an example data server machine 1406 employing an electro-optical IC module having photonic and electrical ICs and an integrated switchable waveguide device, in accordance with some embodiments. Server machine 1406 may be any commercial server, for example, including any number of high-performance computing platforms disposed within a rack and networked together for electronic data processing, which in the exemplary embodiment includes one or more devices 1450 having an IC module with photonic and electrical ICs and an integrated switchable waveguide device.

Server machine 1406 includes a battery and/or power supply 1415 to provide power to devices 1450, and to provide, in some embodiments, power delivery functions such as power regulation. Devices 1450 may be deployed as part of a package-level integrated system 1410. Integrated system 1410 is further illustrated in the expanded view 1420. In the exemplary embodiment, devices 1450 (labeled "Memory/Processor") includes at least one memory chip (e.g., RAM), and/or at least one processor chip (e.g., a microprocessor, a multi-core microprocessor, or graphics processor, or the like) having the characteristics discussed herein. In an embodiment, device 1450 is a microprocessor including an SRAM cache memory. As shown, device 1450 may include an IC module having photonic and electrical ICs and an integrated switchable waveguide device, as discussed herein. Device 1450 may be further coupled to (e.g., communicatively coupled to) a board, an interposer, or system substrate 199 along with, one or more of a power management IC (PMIC) 1430, RF (wireless) IC (RFIC) 1425, including a wideband RF (wireless) transmitter and/or receiver (TX/RX) (e.g., including a digital baseband and an analog front end module further includes a power amplifier on a transmit path and a low noise amplifier on a receive path), and a controller 1435 thereof. In some embodiments, RFIC 1425, PMIC 1430, controller 1435, and device 1450 include IC modules having photonic and electrical ICs and an integrated switchable waveguide device.

Figure 15:
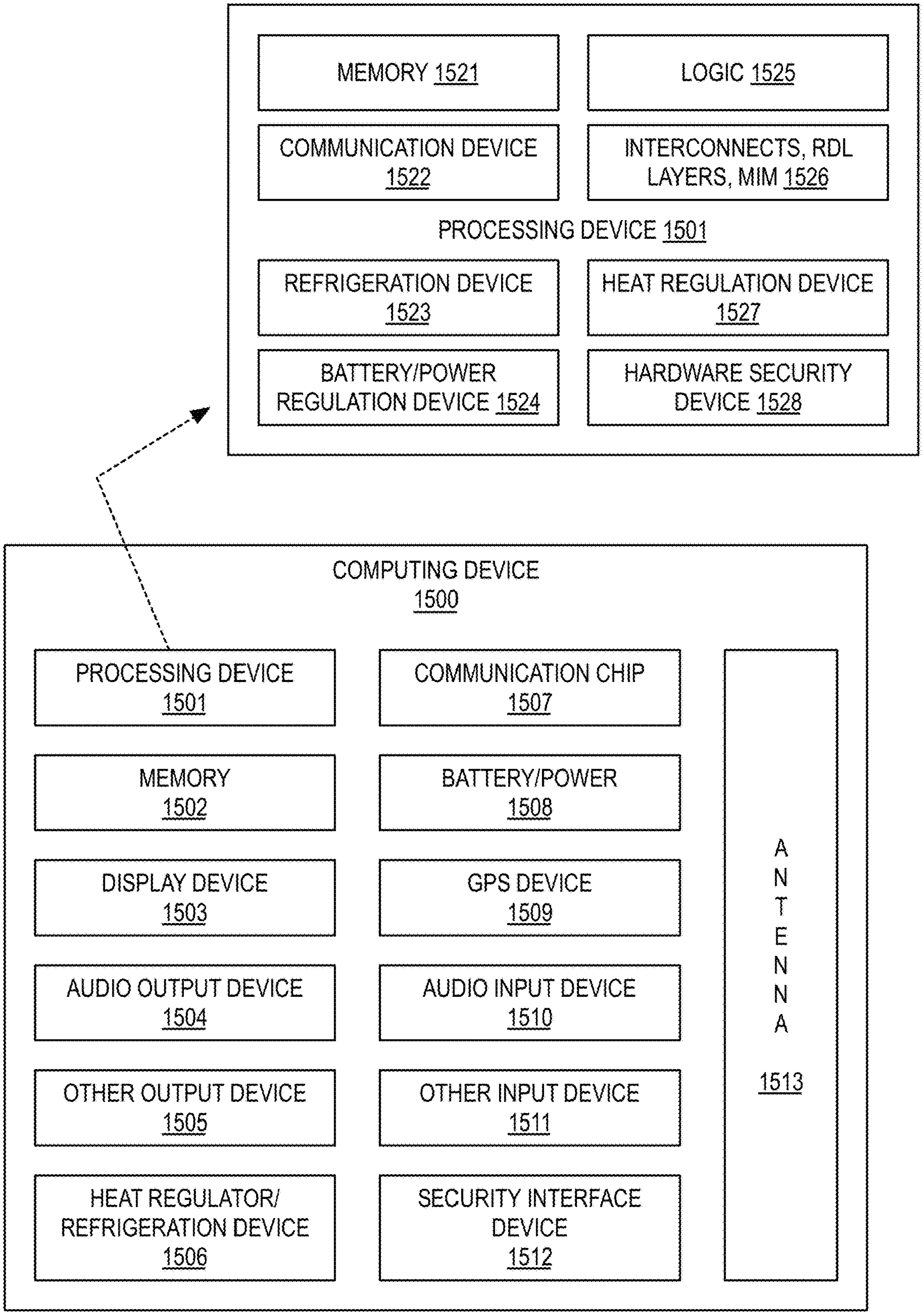
FIG. 15 is a block diagram of an example computing device, all in accordance with some embodiments.

FIG. 15 is a block diagram of an example computing device 1500, in accordance with some embodiments. For example, one or more components of computing device 1500 may include any of the devices or structures discussed herein. A number of components are illustrated in FIG. 15 as being included in computing device 1500, but any one or more of these components may be omitted or duplicated, as suitable for the application. In some embodiments, some or all of the components included in computing device 1500 may be attached to one or more printed circuit boards (e.g., a motherboard). In some embodiments, various ones of these components may be fabricated onto a single system-on-a-chip (SoC) die. Additionally, in various embodiments, computing device 1500 may not include one or more of the components illustrated in FIG. 15, but computing device 1500 may include interface circuitry for coupling to the one or more components. For example, computing device 1500 may not include a display device 1503, but may include display device interface circuitry (e.g., a connector and driver circuitry) to which display device 1503 may be coupled. In another set of examples, computing device 1500 may not include an audio output device 1504, other output device 1505, global positioning system (GPS) device 1509, audio input device 1510, or other input device 1511, but may include audio output device interface circuitry, other output device interface circuitry, GPS device interface circuitry, audio input device interface circuitry, audio input device interface circuitry, to which audio output device 1504, other output device 1505, GPS device 1509, audio input device 1510, or other input device 1511 may be coupled.

Computing device 1500 may include a processing device 1501 (e.g., one or more processing devices). As used herein, the term "processing device" or "processor" indicates a device that processes electronic data from registers and/or memory to transform that electronic data into other electronic data that may be stored in registers and/or memory (e.g., SRAM). Processing device 1501 may include a memory 1521, a communication device 1522, a refrigeration device 1523, a battery/power regulation device 1524, logic 1525, interconnects 1526 (i.e., optionally including RDL or metal-insulator-metal (MIM) devices), a heat regulation device 1527, and a hardware security device 1528.

Processing device 1501 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices.

Computing device 1500 may include a memory 1502, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, memory 1502 includes memory that shares a die with processing device 1501. This memory may be used as cache memory and may include embedded dynamic random-access memory (eDRAM) or spin transfer torque magnetic random-access memory (STT-M RAM).

Computing device 1500 may include a heat regulation/refrigeration device 1506. Heat regulation/refrigeration device 1506 may maintain processing device 1501 (and/or other components of computing device 1500) at a predetermined low temperature during operation.

In some embodiments, computing device 1500 may include a communication chip 1507 (e.g., one or more communication chips). For example, the communication chip 1507 may be configured for managing wireless communications for the transfer of data to and from computing device 1500. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

Communication chip 1507 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. Communication chip 1507 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. Communication chip 1507 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication chip 1507 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication chip 1507 may operate in accordance with other wireless protocols in other embodiments. Computing device 1500 may include an antenna 1513 to facilitate wireless communications and/or to receive other wireless communications (such as AM or FM radio transmissions).

In some embodiments, communication chip 1507 may manage wired communications, such as electrical, optical, or any other suitable communication protocols (e.g., the Ethernet). As noted above, communication chip 1507 may include multiple communication chips. For instance, a first communication chip 1507 may be dedicated to shorter-range wireless communications such as Wi-Fi or Bluetooth, and a second communication chip 1507 may be dedicated to longer-range wireless communications such as GPS, EDGE, GPRS, CDMA, WiMAX, LTE, EV-DO, or others. In some embodiments, a first communication chip 1507 may be dedicated to wireless communications, and a second communication chip 1507 may be dedicated to wired communications.

Computing device 1500 may include battery/power circuitry 1508. Battery/power circuitry 1508 may include one or more energy storage devices (e.g., batteries or capacitors) and/or circuitry for coupling components of computing device 1500 to an energy source separate from computing device 1500 (e.g., AC line power).

Computing device 1500 may include a display device 1503 (or corresponding interface circuitry, as discussed above). Display device 1503 may include any visual indicators, such as a heads-up display, a computer monitor, a projector, a touchscreen display, a liquid crystal display (LCD), a light-emitting diode display, or a flat panel display, for example.

Computing device 1500 may include an audio output device 1504 (or corresponding interface circuitry, as discussed above). Audio output device 1504 may include any device that generates an audible indicator, such as speakers, headsets, or earbuds, for example.

Computing device 1500 may include an audio input device 1510 (or corresponding interface circuitry, as discussed above). Audio input device 1510 may include any device that generates a signal representative of a sound, such as microphones, microphone arrays, or digital instruments (e.g., instruments having a musical instrument digital interface (MIDI) output).

Computing device 1500 may include a GPS device 1509 (or corresponding interface circuitry, as discussed above). GPS device 1509 may be in communication with a satellite-based system and may receive a location of computing device 1500, as known in the art.

Computing device 1500 may include other output device 1505 (or corresponding interface circuitry, as discussed above). Examples of the other output device 1505 may include an audio codec, a video codec, a printer, a wired or wireless transmitter for providing information to other devices, or an additional storage device.

Computing device 1500 may include other input device 1511 (or corresponding interface circuitry, as discussed above). Examples of the other input device 1511 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

Computing device 1500 may include a security interface device 1512. Security interface device 1512 may include any device that provides security measures for computing device 1500 such as intrusion detection, biometric validation, security encode or decode, access list management, malware detection, or spyware detection.

Computing device 1500, or a subset of its components, may have any appropriate form factor, such as a hand-held or mobile computing device (e.g., a cell phone, a smart phone, a mobile internet device, a music player, a tablet computer, a laptop computer, a netbook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device.

The subject matter of the present description is not necessarily limited to specific applications illustrated in FIGS. 1A-15. The subject matter may be applied to other deposition applications, as well as any appropriate manufacturing application, as will be understood to those skilled in the art.

The following examples pertain to further embodiments, and specifics in the examples may be used anywhere in one or more embodiments.

In one or more first embodiments, an apparatus includes a photonic IC, including a first surface, an electrical IC, including a second surface, wherein a first portion of the second surface is soldered to the first surface, and a switchable waveguide device optically coupled to the photonic IC, wherein the switchable waveguide device includes a first metallization structure, a second metallization structure, and a nonlinear optical material, wherein the nonlinear optical material is over a second portion of the second surface, and the nonlinear optical material is above or at a same level with the first and second metallization structures, the first and second metallization structures on opposite sides of the nonlinear optical material.

In one or more second embodiments, further to the first embodiments, the first and second metallization structures are not included in the photonic IC or the electrical IC.

In one or more third embodiments, further to the first or second embodiments, the nonlinear optical material is between, and coupled to both of, the photonic IC and the electrical IC.

In one or more fourth embodiments, further to the first through third embodiments, the electrical IC includes the first and second metallization structures.

In one or more fifth embodiments, further to the first through fourth embodiments, the photonic IC includes the first and second metallization structures.

In one or more sixth embodiments, further to the first through fifth embodiments, the electrical IC includes a third metallization structure and a fourth metallization structure, the first metallization structure is soldered to the third metallization structure, and the second metallization structure is soldered to the fourth metallization structure.

In one or more seventh embodiments, further to the first through sixth embodiments, the electrical IC includes a third surface and interconnect interfaces on the third surface, the third surface distal the second surface and the photonic IC.

In one or more eighth embodiments, a system includes an electrical IC, coupled to a substrate, a photonic IC, wherein the photonic IC is soldered to a first portion of the electrical IC, and a switchable waveguide device optically coupled to, the photonic IC, the switchable waveguide device including a nonlinear optical material and first and second metallization structures, wherein the nonlinear optical material is over a second portion of the electrical IC and is between the photonic IC and the electrical IC.

In one or more ninth embodiments, further to the eighth embodiments, the first and second metallization structures are not included in the photonic IC or the electrical IC.

In one or more tenth embodiments, further to the eighth or ninth embodiments, the nonlinear optical material is between, and coupled to both of, the photonic IC and the electrical IC.

In one or more eleventh embodiments, further to the eighth through tenth embodiments, the electrical IC includes the first and second metallization structures.

In one or more twelfth embodiments, further to the eighth through eleventh embodiments, the photonic IC includes the first and second metallization structures.

In one or more thirteenth embodiments, further to the eighth through twelfth embodiments, the electrical IC includes a third metallization structure and a fourth metallization structure, the first metallization structure is soldered to the third metallization structure, and the second metallization structure is soldered to the fourth metallization structure.

In one or more fourteenth embodiments, further to the eighth through thirteenth embodiments, the electrical IC includes interconnect interfaces on a surface distal the photonic IC, and the interconnect interfaces are soldered to the system substrate.

In one or more fifteenth embodiments, a method includes receiving a nonlinear optical material, a photonic IC, and an electrical IC, wherein the nonlinear optical material is not included in the photonic IC, forming a switchable waveguide device, the switchable waveguide device including a first metallization structure, a second metallization structure, and the nonlinear optical material, wherein the nonlinear optical material is above or at a same level with the first and second metallization structures, and bonding the photonic IC and the electrical IC.

In one or more sixteenth embodiments, further to the fifteenth embodiments, bonding the photonic IC and the electrical IC includes soldering the photonic IC to the electrical IC.

In one or more seventeenth embodiments, further to the fifteenth or sixteenth embodiments, forming the switchable waveguide device includes coupling the nonlinear optical material in a cavity in the photonic IC.

In one or more eighteenth embodiments, further to the fifteenth through seventeenth embodiments, forming the switchable waveguide device includes coupling the nonlinear optical material to the electrical IC, wherein the electrical IC includes the first and second metallization structures.

In one or more nineteenth embodiments, further to the fifteenth through eighteenth embodiments, forming the switchable waveguide device includes coupling the nonlinear optical material to the photonic IC, wherein the photonic IC includes the first and second metallization structures.

In one or more twentieth embodiments, further to the fifteenth through nineteenth embodiments, bonding the photonic IC and the electrical IC includes soldering the first and second metallization structures of the switchable waveguide device to the electrical IC.

The disclosure can be practiced with modification and alteration, and the scope of the appended claims is not limited to the embodiments so described. For example, the above embodiments may include specific combinations of features. However, the above embodiments are not limiting in this regard and, in various implementations, the above embodiments may include the undertaking only a subset of such features, undertaking a different order of such features, undertaking a different combination of such features, and/or undertaking additional features than those features explicitly listed. The scope of the patent rights should, therefore, be determined with reference to the appended claims, along with the full scope of equivalents to which such claims are entitled.

We claim:

1. An apparatus, comprising:

a photonic integrated circuit (IC), comprising a first surface;

an electrical IC, comprising a second surface, wherein a first portion of the second surface is soldered to the first surface; and a switchable waveguide device optically coupled to the photonic IC, wherein the switchable waveguide device comprises a first metallization structure, a second metallization structure, and a nonlinear optical material, wherein the nonlinear optical material is over a second portion of the second surface, and the nonlinear optical material is above or at a same level with the first and second metallization structures, the first and second metallization structures on opposite sides of the nonlinear optical material.

2. The apparatus of claim 1, wherein the first and second metallization structures are not comprised in the photonic IC or the electrical IC.

3. The apparatus of claim 1, wherein the nonlinear optical material is between, and coupled to both of, the photonic IC and the electrical IC.

4. The apparatus of claim 1, wherein the electrical IC comprises the first and second metallization structures.

5. The apparatus of claim 1, wherein the photonic IC comprises the first and second metallization structures.

6. The apparatus of claim 5, wherein the electrical IC comprises a third metallization structure and a fourth metallization structure, the first metallization structure is soldered to the third metallization structure, and the second metallization structure is soldered to the fourth metallization structure.

7. The apparatus of claim 1, wherein the electrical IC comprises a third surface and interconnect interfaces on the third surface, the third surface distal the second surface and the photonic IC.

8. A system, comprising:

an electrical integrated circuit (IC), coupled to a substrate;

a photonic IC, wherein the photonic IC is soldered to a first portion of the electrical IC; and a switchable waveguide device optically coupled to the photonic IC, the switchable waveguide device comprising a nonlinear optical material and first and second metallization structures, wherein the nonlinear optical material is over a second portion of the electrical IC and is between the photonic IC and the electrical IC.

9. The system of claim 8, wherein the first and second metallization structures are not comprised in the photonic IC or the electrical IC.

10. The system of claim 8, wherein the nonlinear optical material is between, and coupled to both of, the photonic IC and the electrical IC.

11. The system of claim 8, wherein the electrical IC comprises the first and second metallization structures.

12. The system of claim 8, wherein the photonic IC comprises the first and second metallization structures.

13. The system of claim 12, wherein the electrical IC comprises a third metallization structure and a fourth metallization structure, the first metallization structure is soldered to the third metallization structure, and the second metallization structure is soldered to the fourth metallization structure.

14. The system of claim 8, wherein the electrical IC comprises interconnect interfaces on a surface distal the photonic IC, and the interconnect interfaces are soldered to the substrate.

15. A method, comprising:

receiving a nonlinear optical material, a photonic integrated circuit (IC), and an electrical IC, wherein the nonlinear optical material is not comprised in the photonic IC;

forming a switchable waveguide device, the switchable waveguide device comprising a first metallization structure, a second metallization structure, and the nonlinear optical material, wherein the nonlinear optical material is above or at a same level with the first and second metallization structures; and bonding the photonic IC and the electrical IC.

16. The method of claim 15, wherein bonding the photonic IC and the electrical IC comprises soldering the photonic IC to the electrical IC.

17. The method of claim 15, wherein forming the switchable waveguide device comprises coupling the nonlinear optical material in a cavity in the photonic IC.

18. The method of claim 15, wherein forming the switchable waveguide device comprises coupling the nonlinear optical material to the electrical IC, wherein the electrical IC comprises the first and second metallization structures.

19. The method of claim 15, wherein forming the switchable waveguide device comprises coupling the nonlinear optical material to the photonic IC, wherein the photonic IC comprises the first and second metallization structures.

20. The method of claim 19, wherein bonding the photonic IC and the electrical IC comprises soldering the first and second metallization structures of the switchable waveguide device to the electrical IC.

* * * * *